(12) United States Patent
Kato et al.

(10) Patent No.: US 12,250,469 B2
(45) Date of Patent: Mar. 11, 2025

(54) GATING CAMERA, SENSING SYSTEM FOR VEHICLE, AND LIGHTING UNIT FOR VEHICLE

(71) Applicant: KOITO MANUFACTURING CO., LTD., Tokyo (JP)

(72) Inventors: Daiki Kato, Shizuoka (JP); Masayuki Takahashi, Shizuoka (JP); Koji Itaba, Shizuoka (JP); Shun Tanemoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 159 days.

(21) Appl. No.: 17/916,377

(22) PCT Filed: Apr. 2, 2021

(86) PCT No.: PCT/JP2021/014289
§ 371 (c)(1),
(2) Date: Sep. 30, 2022

(87) PCT Pub. No.: WO2021/201269
PCT Pub. Date: Oct. 7, 2021

(65) Prior Publication Data
US 2023/0156341 A1   May 18, 2023

(30) Foreign Application Priority Data

Apr. 2, 2020  (JP) ................ 2020-066482
Apr. 6, 2020  (JP) ................ 2020-068259
Apr. 6, 2020  (JP) ................ 2020-068260

(51) Int. Cl.
*H04N 23/72* (2023.01)
*H04N 23/73* (2023.01)
*H04N 23/74* (2023.01)

(52) U.S. Cl.
CPC ............. *H04N 23/72* (2023.01); *H04N 23/73* (2023.01); *H04N 23/74* (2023.01)

(58) Field of Classification Search
CPC ........ H04N 23/72; H04N 23/73; H04N 23/74; H04N 23/61; H04N 25/40; H04N 25/53;
(Continued)

(56) References Cited

U.S. PATENT DOCUMENTS 9,760,837 B1    9/2017  Nowozin et al.
10,656,275 B1*  5/2020  Bills ...................... H01S 5/183
(Continued)

FOREIGN PATENT DOCUMENTS

CN    101004836 A    7/2007
CN    101378700 A    3/2009
(Continued)

OTHER PUBLICATIONS

Search Report (PCT/ISA/210) issued Jun. 22, 2021 by the International Searching Authority for International Patent Application No. PCT/JP2021/014289.
(Continued)

*Primary Examiner* — Jared Walker
(74) *Attorney, Agent, or Firm* — Sughrue Mion, PLLC

(57) ABSTRACT

A gated camera divides a depth direction into a plurality of ranges and generates a plurality of slice images corresponding to the plurality of ranges. An illumination device radiates probe light. A controller controls a light emission timing of the illumination device and an exposure timing of an image sensor. An image processing device generates a slice image based on a sensor image transmitted from the image sensor. The image processing device selects M (M≥2) pixel values in ascending order of pixel values for each line of the sensor (Continued)

image, calculates an average value of the M pixel values, and subtracts the average value from each pixel value of the corresponding line.

8 Claims, 23 Drawing Sheets

(58) Field of Classification Search
CPC ..... G01S 17/894; G01S 17/931; G03B 7/091; G03B 15/00; G03B 15/05
See application file for complete search history.

(56) References Cited

U.S. PATENT DOCUMENTS

| | | |
|---|---|---|
| 2004/0047621 A1 | 3/2004 | Shimizu et al. |
| 2004/0057613 A1 | 3/2004 | Noto et al. |
| 2005/0196161 A1 | 9/2005 | Matsuo |
| 2006/0202036 A1 | 9/2006 | Wang et al. |
| 2006/0202038 A1 | 9/2006 | Wang et al. |
| 2007/0140592 A1 | 6/2007 | Toyoda et al. |
| 2007/0153116 A1 | 7/2007 | Nakao et al. |
| 2008/0319317 A1 | 12/2008 | Kamiyama et al. |
| 2010/0134662 A1 | 6/2010 | Bub |
| 2010/0149407 A1 | 6/2010 | Lee et al. |
| 2012/0257101 A1 | 10/2012 | Bub |
| 2016/0092735 A1* | 3/2016 | Govil ................... H04N 25/40 382/103 |
| 2016/0287191 A1 | 10/2016 | Koehler et al. |
| 2017/0269198 A1 | 9/2017 | Hall et al. |
| 2018/0129973 A1 | 5/2018 | Nowozin et al. |
| 2018/0255258 A1 | 9/2018 | Shin |
| 2018/0352152 A1* | 12/2018 | Meindl ................. H04N 23/80 |
| 2019/0004150 A1* | 1/2019 | Mano ................... G01S 7/4868 |
| 2019/0056498 A1* | 2/2019 | Sonn .................... G01S 17/931 |
| 2019/0098232 A1* | 3/2019 | Mori ................... H01L 27/1464 |
| 2019/0129034 A1* | 5/2019 | Yoshida ................. G01S 17/18 |
| 2019/0158732 A1* | 5/2019 | Shimauchi ............. H04N 23/67 |
| 2019/0162823 A1* | 5/2019 | Eckstein ............... G01S 13/865 |
| 2020/0074941 A1 | 3/2020 | Takahashi |
| 2020/0108766 A1 | 4/2020 | Shibata |
| 2020/0336652 A1 | 10/2020 | Shimauchi et al. |

FOREIGN PATENT DOCUMENTS

| | | |
|---|---|---|
| CN | 101690162 A | 3/2010 |
| CN | 102324014 A | 1/2012 |
| CN | 104104882 A | 10/2014 |
| CN | 105828717 A | 8/2016 |
| CN | 107295236 A | 10/2017 |
| CN | 108885701 A | 11/2018 |
| CN | 109314749 A | 2/2019 |
| CN | 110036436 A | 7/2019 |
| CN | 110278391 A | 9/2019 |
| CN | 110709281 A | 1/2020 |
| JP | 2001-126065 A | 5/2001 |
| JP | 2004-37657 A | 2/2004 |
| JP | 2007-174476 A | 7/2007 |
| JP | 2009-257981 A | 11/2009 |
| JP | 2010-121995 A | 6/2010 |
| JP | 2010-527024 A | 8/2010 |
| JP | 2012-210293 A | 11/2012 |
| JP | 2012-222632 A | 11/2012 |
| JP | 2018-207413 A | 12/2018 |
| JP | 2019-512706 A | 5/2019 |
| WO | 2015/114906 A1 | 8/2015 |
| WO | 2017/086010 A1 | 5/2017 |
| WO | 2017/110417 A1 | 6/2017 |

OTHER PUBLICATIONS

Written Opinion (PCT/ISA/237) issued Jun. 22, 2021 by the International Searching Authority for International Patent Application No. PCT/JP2021/014289.
Chinese OA issued by the Intellectual Property Office of PR China dated Oct. 25, 2023 in App No. 202180027071.9.
Office Action issued on Apr. 30, 2024 by the Chinese Patent Office in corresponding CN Patent Application No. 202180027071.9.

* cited by examiner

BEFORE NOISE SUBTRACTION PROCESSING

AFTER NOISE SUBTRACTION PROCESSING

BEFORE NOISE SUBTRACTION PROCESSING

AFTER NOISE SUBTRACTION PROCESSING

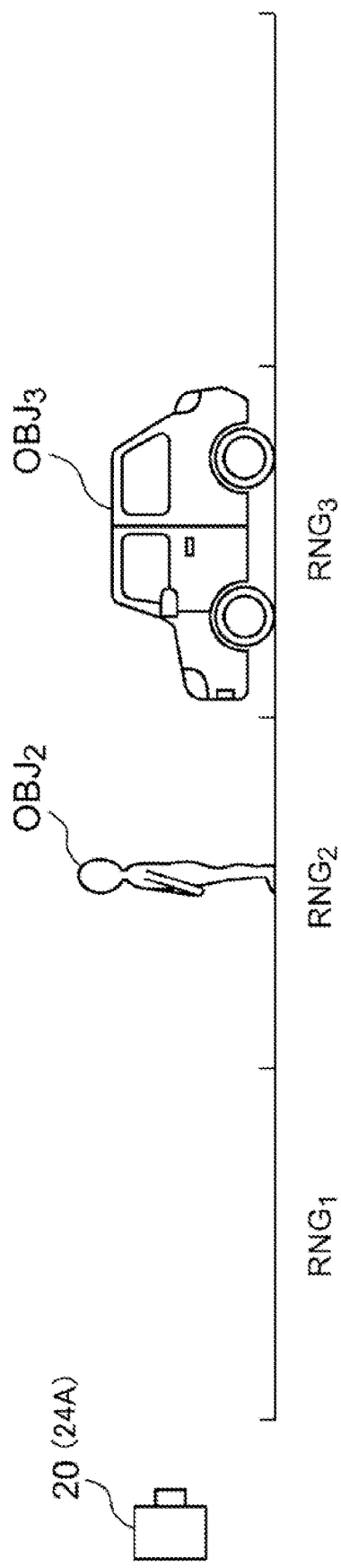
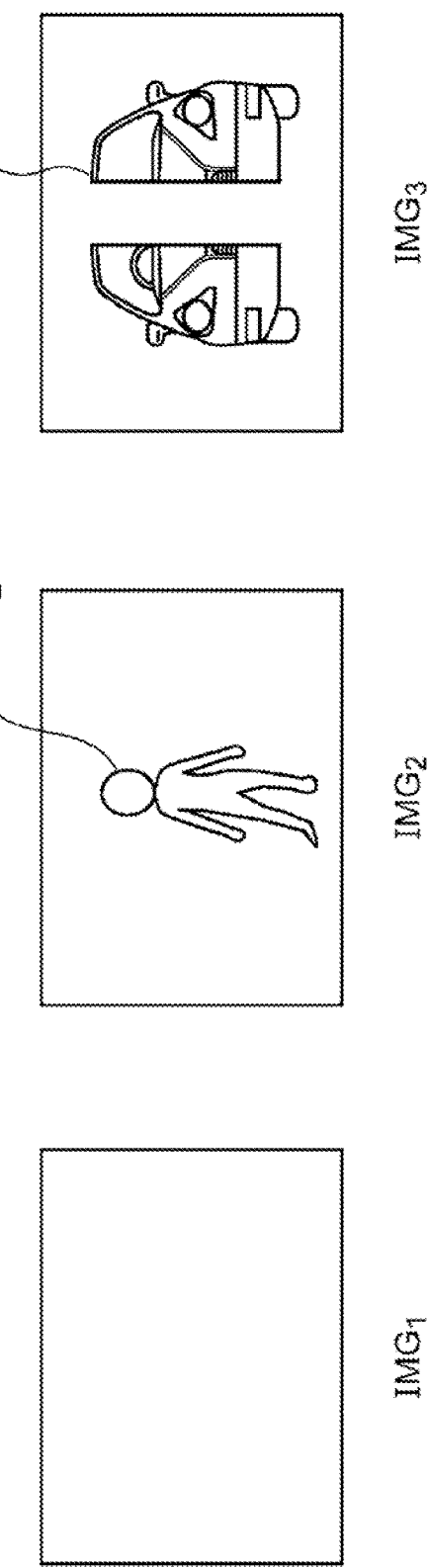
FIG. 10A
FIG. 10B

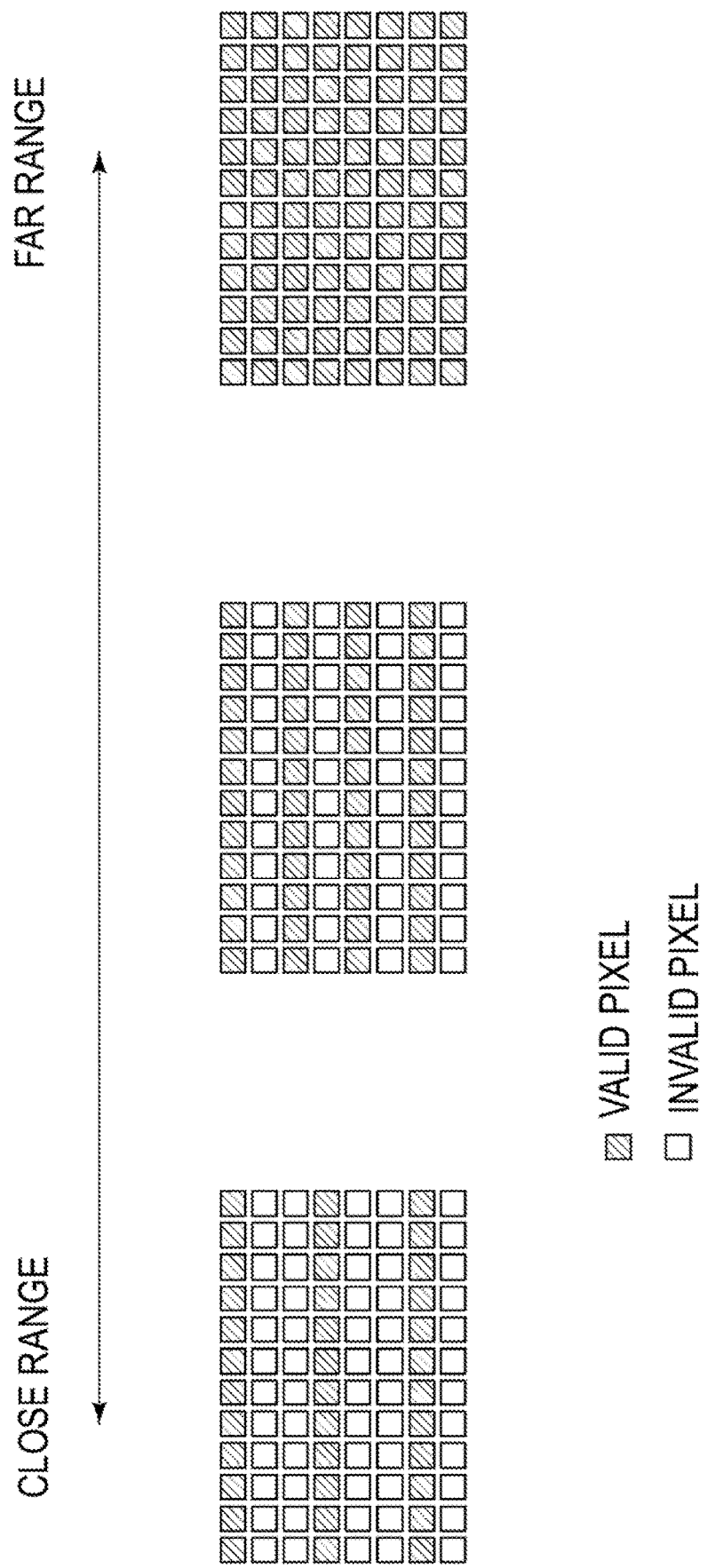

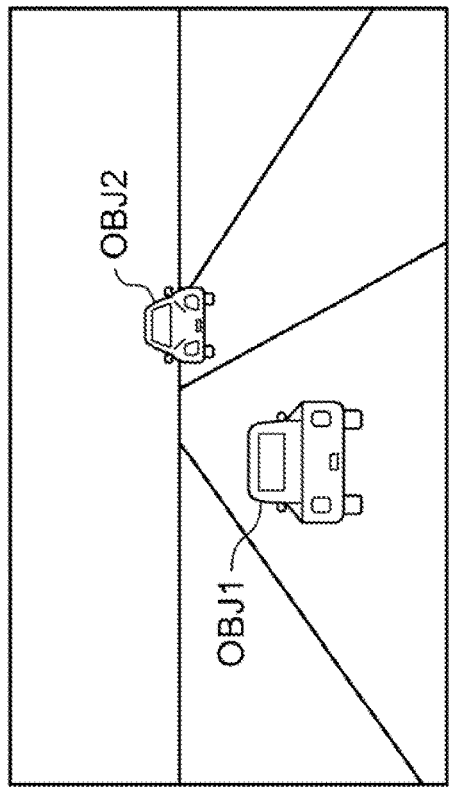
FIG. 12A
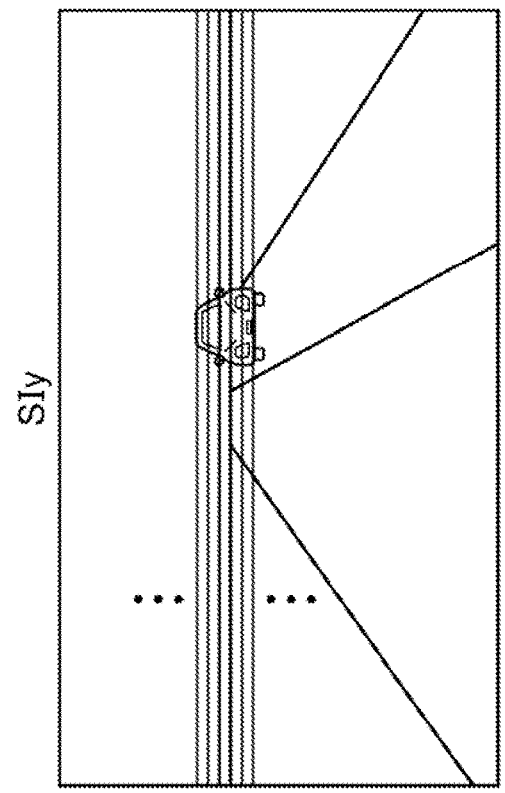
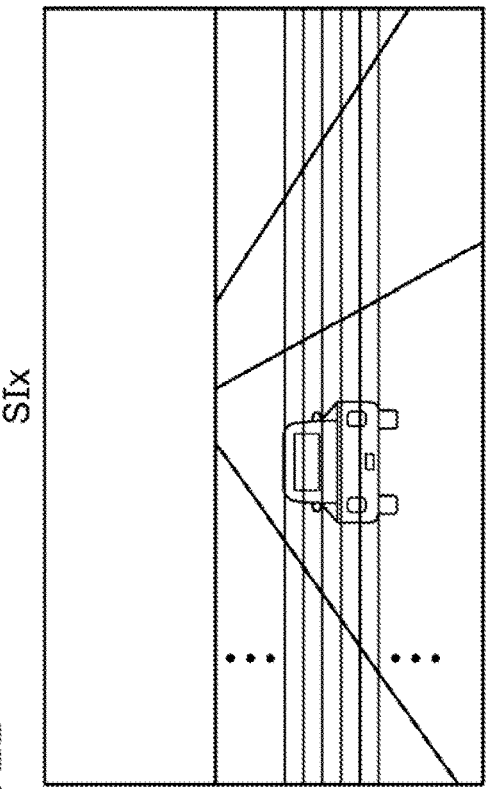
FIG. 12B

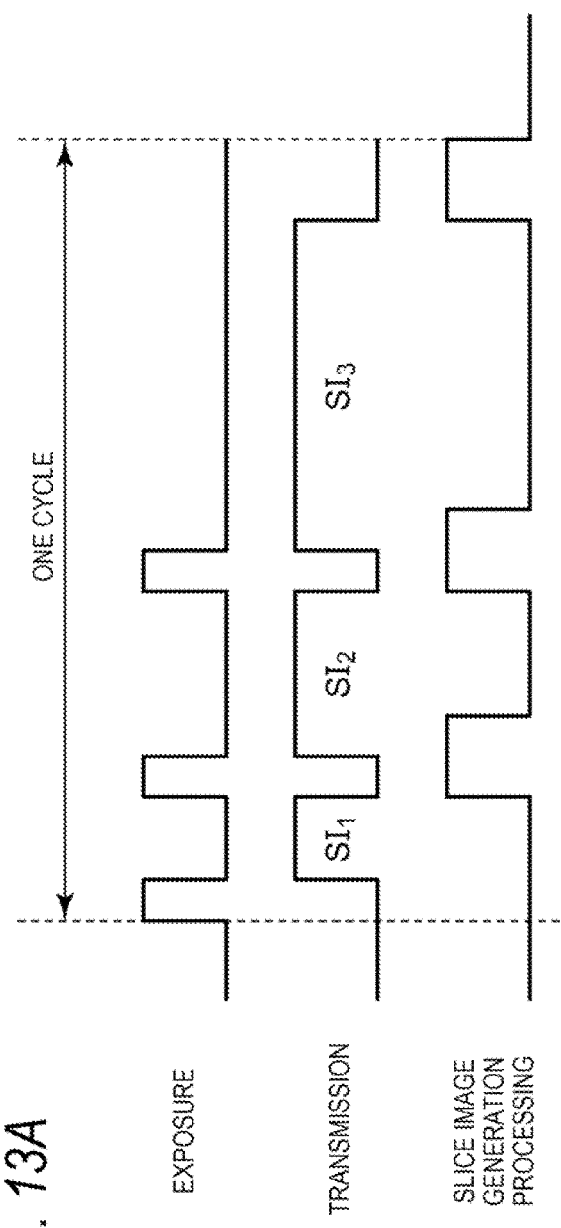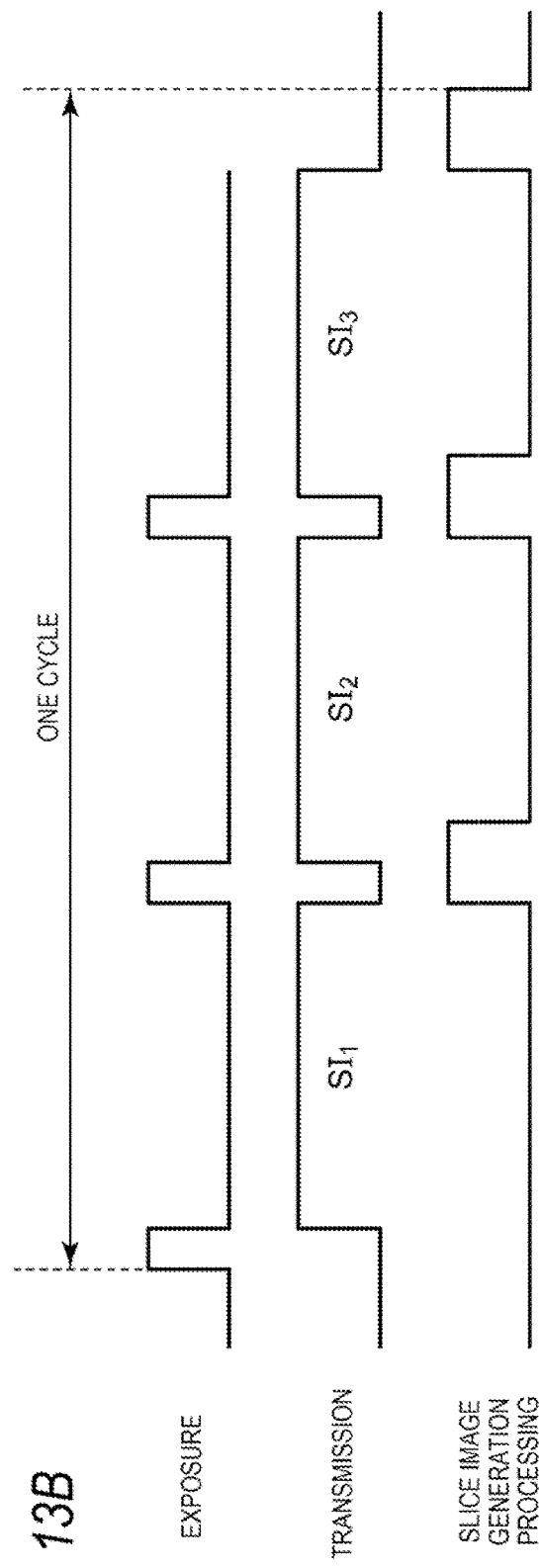

FIG. 17
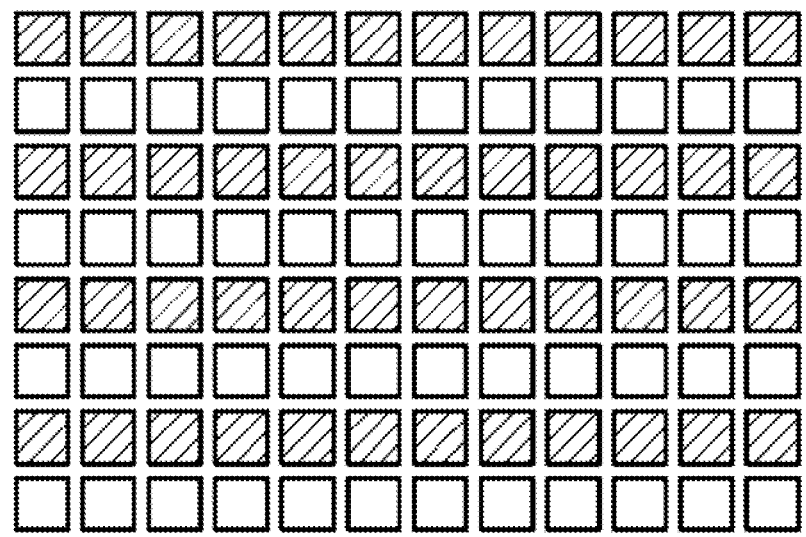
 FIRST PIXEL GROUP (FIRST LINE GROUP)
 SECOND PIXEL GROUP (SECOND LINE GROUP)

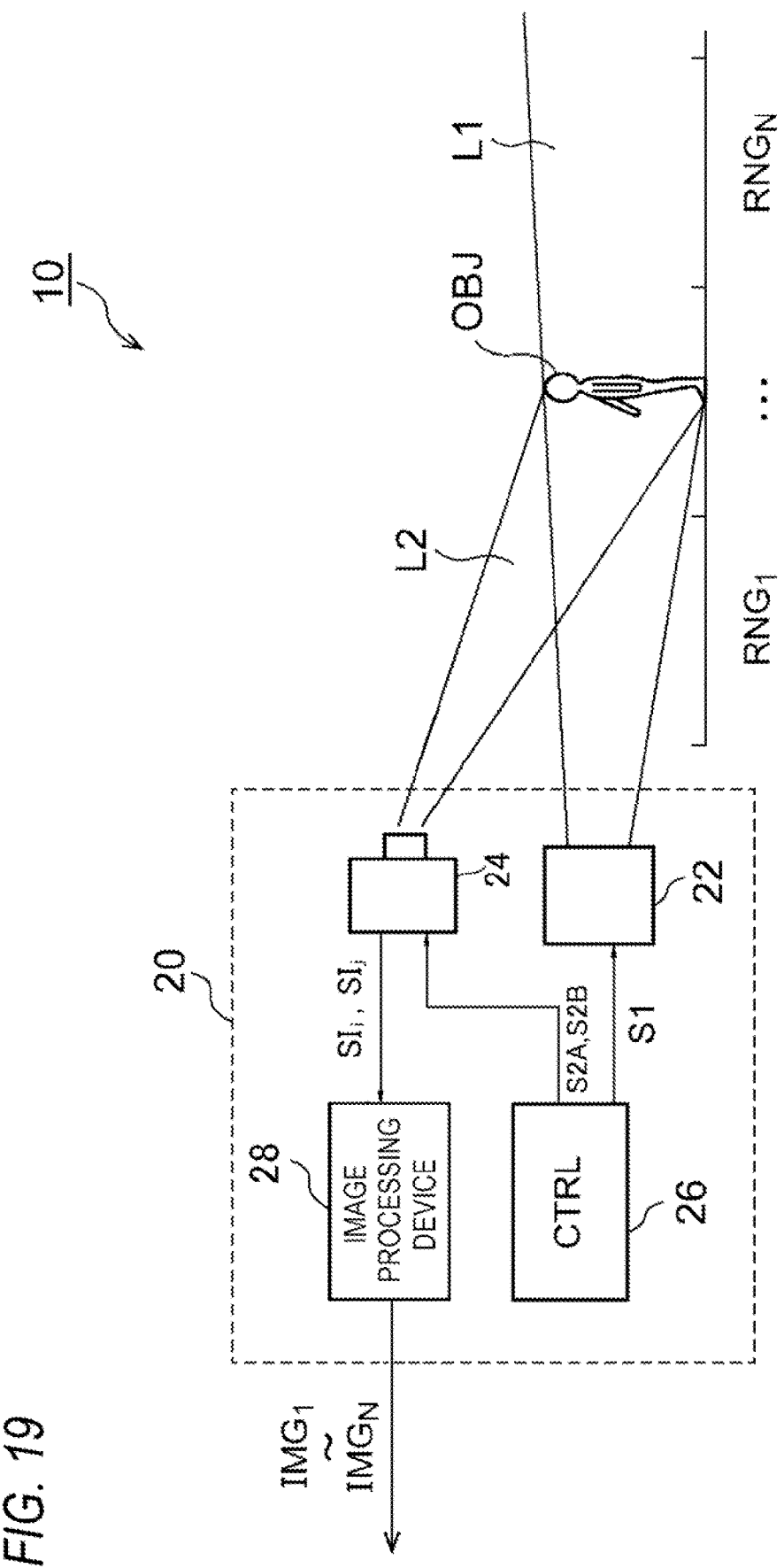

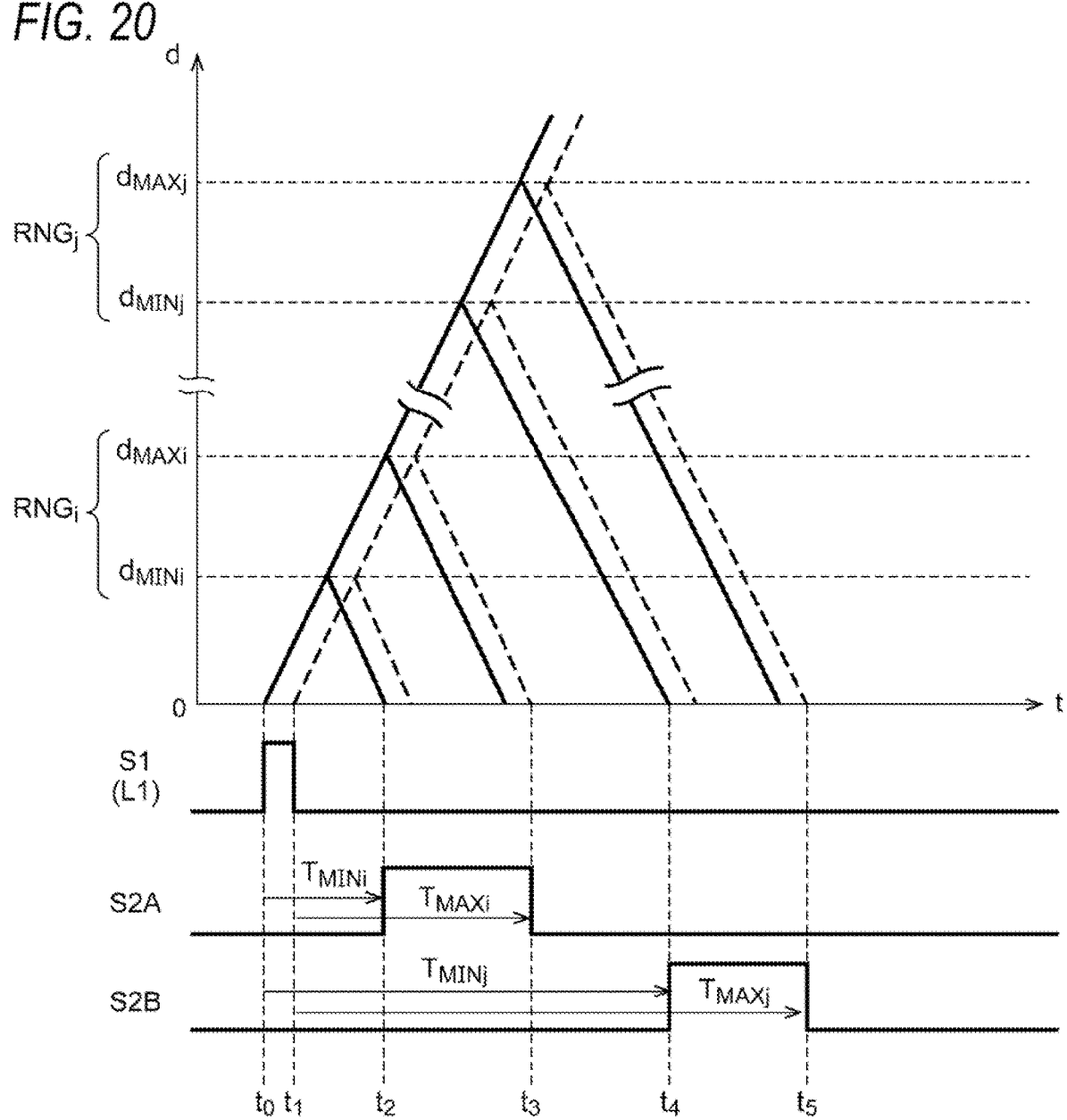

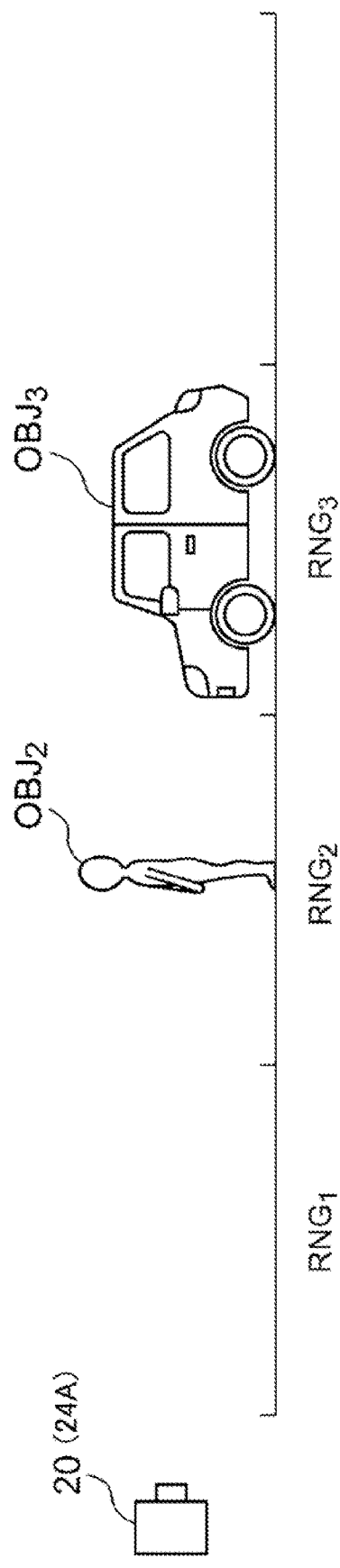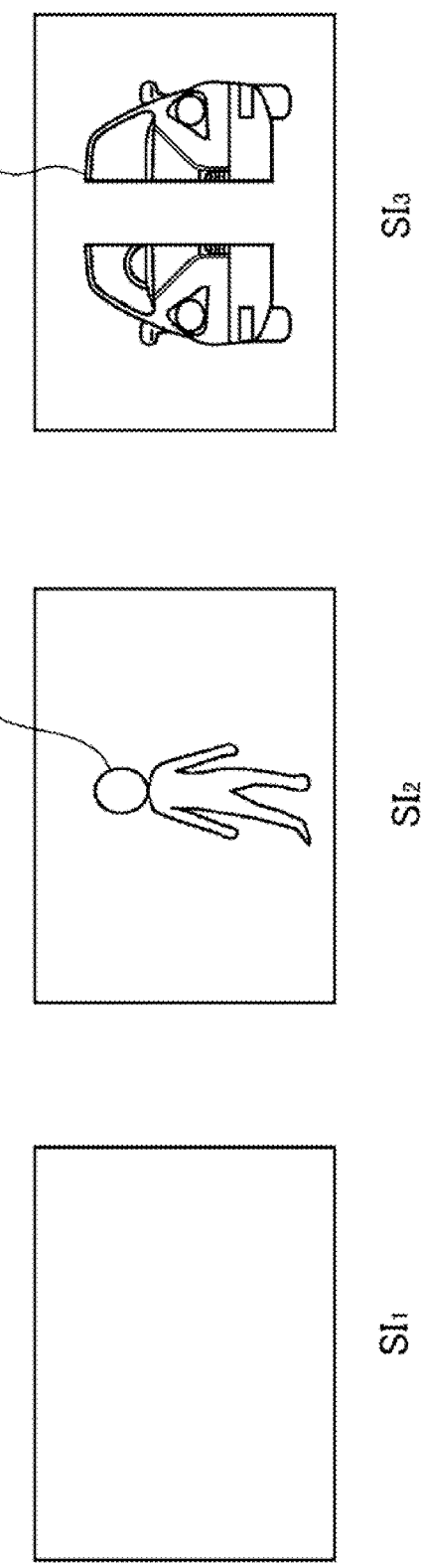
FIG. 21A
FIG. 21B

GATING CAMERA, SENSING SYSTEM FOR VEHICLE, AND LIGHTING UNIT FOR VEHICLE

CROSS REFERENCE TO RELATED APPLICATIONS

This application is a National Stage of International Application No. PCT/JP2021/014289 filed Apr. 2, 2021, claiming priority from Japanese Application Nos. 2020-066482, 2020-068259, and 2020-068260 all filed on Apr. 6, 2020, the disclosures of which are incorporated herein in their entirety by reference.

TECHNICAL FIELD

The present invention relates to a gated camera.

BACKGROUND ART

For automatic driving and automatic control on light distribution of a headlamp, an object identification system that senses a position and a type of an object present around a vehicle is used. The object identification system includes a sensor and an arithmetic processing device that analyzes an output of the sensor. The sensor is selected from a camera, light detection and ranging or laser imaging detection and ranging (LiDAR), a millimeter wave radar, an ultrasonic sonar, and the like in consideration of use, required accuracy, and cost.

It is not possible to obtain depth information from a general monocular camera. Therefore, when a plurality of objects located at different distances overlap one another, it is difficult to separate them from one another.

As a camera from which the depth information is obtained, a time of flight camera (TOF camera) is known. The time of flight (TOF) camera projects infrared light by a light emitting device, measures a flight time until reflected light returns to an image sensor, and obtains a TOF image in which the flight time is converted into distance information.

An active sensor (hereinafter, referred to as gated camera or gating camera in the present description) has been proposed in place of the TOF camera (Patent Literatures 1 and 2). The gated camera divides an imaging range into a plurality of ranges, and performs imaging by changing an exposure timing and an exposure time for each range. Accordingly, a slice image is obtained for each target range, and each slice image merely includes the object included in the corresponding range.

CITATION LIST

Patent Literature

Patent Literature 1: JP2009-257981A
Patent Literature 2: WO2017/110417A1

SUMMARY OF INVENTION

Technical Problem

1. The present inventors have recognized that, at the time of operating a gated camera, noise in horizontal stripes may randomly occur in an output image (sensor image) of an image sensor, and an image quality of a slice image may be deteriorated.

An aspect of the present invention has been made in such a situation, and an exemplary object thereof is to provide a gated camera capable of preventing deterioration in a slice image.

2. The gated camera includes an image sensor and an image processing device that processes an output image (sensor image) of the image sensor. Here, the image sensor and the image processing device are often connected by a serial interface, and a transmission speed of the sensor image during this connection becomes a bottleneck, a time required to generate one slice image becomes long, and a frame rate of the gated camera is limited.

An aspect of the present invention has been made in such a situation, and an exemplary object thereof is to provide a gated camera capable of shortening a generation time of a slice image.

3. Since the gated camera in the related art performs one exposure for one light emission, merely the slice image of one range is generated for each light emission. Therefore, in order to sense all of N ranges, a set of light emission and exposure is required N times, and a sensing time becomes long. When light emission and exposure are repeatedly integrated a plurality of times at the time of imaging a distant range, the sensing time becomes further longer.

An aspect of the present invention has been made in such a situation, and an exemplary object thereof is to provide a gated camera capable of shortening a sensing time.

Solution to Problem

1. A gated camera according to an aspect of the present invention divides a depth direction into a plurality of ranges and generates a plurality of slice images corresponding to the plurality of ranges. The gated camera includes an illumination device configured to radiate probe light, an image sensor, a controller configured to control a light emission timing of the illumination device and an exposure timing of the image sensor, and an image processing device configured to generate the slice images based on a sensor image transmitted from the image sensor. The image processing device selects M (M≥2) pixel values in ascending order of pixel values for each line of the sensor image, calculates an average value of the M pixel values, and subtracts the average value from each pixel value of the corresponding line.

2. An aspect of the present invention relates to a gated camera configured to divide a depth direction into a plurality of ranges and generate a plurality of slice images corresponding to the plurality of ranges. The gated camera includes an illumination device configured to radiate probe light, an image sensor including a plurality of pixels, a controller configured to control a light emission timing of the illumination device and an exposure timing of the image sensor, and an image processing device configured to generate the slice images based on a sensor image transmitted from the image sensor. A resolution of the sensor image transmitted from the image sensor to the image processing device is lower as the range is closer.

3. An aspect of the present invention relates to a gated camera configured to divide a depth direction into a plurality of ranges and generate a plurality of slice images corresponding to the plurality of ranges. The gated camera includes an illumination device configured to radiate probe light, an image sensor including a plurality of pixels, and a controller configured to control a light emission timing of the illumination device and an exposure timing of the image sensor. The plurality of pixels of the image sensor are classified into a plurality of pixel groups, and the controller exposes the plurality of pixel groups at different timings with respect to one light emission of the illumination device.

Advantageous Effects of Invention

According to a first aspect of the present invention, an image quality of a slice image can be improved. According to a second aspect of the present invention, a generation time of a slice image can be shortened. According to a third aspect of the present invention, a sensing time can be shortened.

BRIEF DESCRIPTION OF DRAWINGS

FIGS. 10A and 10B are diagrams showing slice images obtained by the gated camera.

FIG. 11 is a diagram showing an example of control on a resolution of the sensor image SI depending on a range.

FIG. 12A is a diagram showing a certain traveling scene, and FIG. 12B is a diagram showing sensor images SIx and SIy obtained in the traveling scene in FIG. 12A.

FIG. 13A is a time chart showing an operation of the gated camera, and FIG. 13B is a time chart showing an operation of a gated camera according to a comparative technique.

FIG. 17 is a diagram showing exposure of the gated camera according to the second modification.

FIG. 19 is a block diagram of a sensing system according to a third embodiment.

FIG. 20 is a time chart showing an operation of the gated camera in FIG. 19.

FIGS. 21A and 21B are diagrams showing slice images obtained by the gated camera in FIG. 19.

DESCRIPTION OF EMBODIMENTS

Overview of Embodiments

Figure 1:
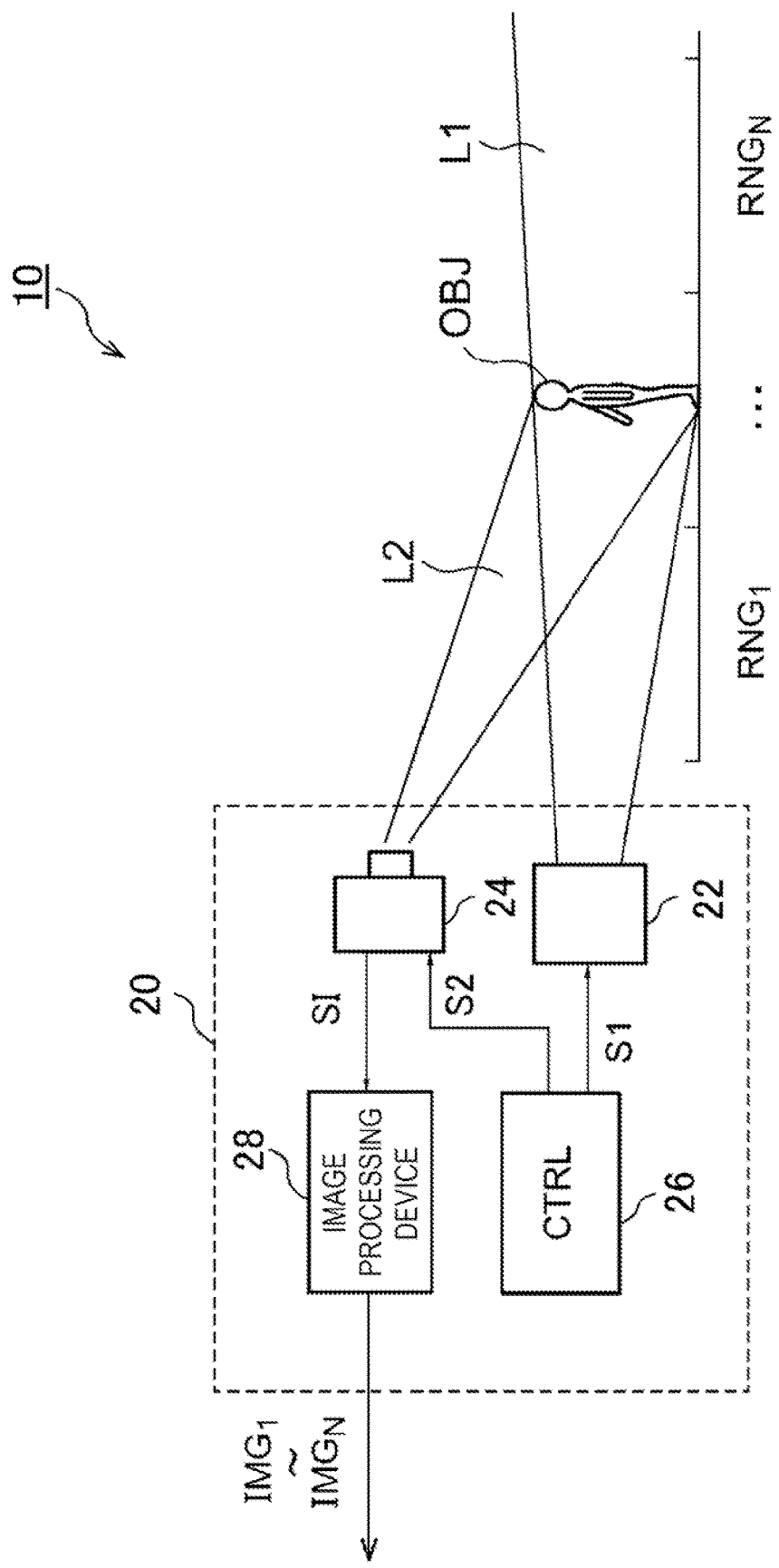
FIG. 1 is a block diagram of a sensing system according to a first embodiment.

An overview of some exemplary embodiments of the present invention will be described. As an introduction of the detailed description to be described later, this overview is intended to simplify and describe some concepts of one or more embodiments for the purpose of basic understanding of the embodiments, and does not limit the scope of the invention or disclosure. In addition, this overview is not a comprehensive overview of all conceivable embodiments, and is not intended to limit components that are essential to the embodiments. For convenience, "one embodiment" may be used to refer to one embodiment (example or modification) or a plurality of embodiments (example or modification) disclosed in the present description.

This overview is not an extensive overview of all conceivable embodiments, and does not intend to specify an important component of all embodiments or to draw a range of a part or all of aspects. As an introduction of the detailed description to be presented later, one of the purposes is to present some concepts of one or more embodiments in a simplified form.

1. A gated camera according to an embodiment divides a depth direction into a plurality of ranges, and generates a plurality of slice images corresponding to the plurality of ranges. The gated camera includes an illumination device configured to radiate probe light, an image sensor, a controller configured to control a light emission timing of the illumination device and an exposure timing of the image sensor, and an image processing device configured to generate the slice images based on a sensor image transmitted from the image sensor. The image processing device selects M (M≥2) pixel values in ascending order of pixel values for each line of the sensor image, calculates an average value of the M pixel values, and subtracts the average value from each pixel value of the corresponding line.

According to this configuration, noise in horizontal stripes can be reduced, and an image quality can be improved.

In an embodiment, M may be 2% to 8% of the number of pixels of the corresponding line.

2. A gated camera according to an embodiment divides a depth direction into a plurality of ranges, and generates a plurality of slice images corresponding to the plurality of ranges. The gated camera includes an illumination device configured to radiate probe light, an image sensor including a plurality of pixels, a controller configured to control a light emission timing of the illumination device and an exposure timing of the image sensor, and an image processing device configured to generate the slice images based on a sensor image transmitted from the image sensor. A resolution of the sensor image transmitted from the image sensor to the image processing device is lower as the range is closer.

In a case where the same subject is imaged by the gated camera, when the subject is present in a distant range, the subject is small, that is, the subject is imaged at a low resolution, and when the subject is present in a close range, the subject is large, that is, the subject is captured at a high resolution. Therefore, as the distance to the subject is shorter, in other words, as the range is closer, by reducing the resolution of the sensor image transmitted from the image sensor to the image processing device, it is possible to shorten a transmission time of the sensor image and shorten a generation time of the slice images while maintaining the resolution necessary for the subsequent processing.

In an embodiment, the image sensor may be capable of specifying presence or absence of transmission for each line for the plurality of pixels, and the number of lines to be skipped is larger as the range is closer.

In an embodiment, the image sensor may be capable of specifying presence or absence of transmission for each column for the plurality of pixels, and the number of columns to be skipped is larger as the range is closer.

In an embodiment, the image sensor may be capable of specifying presence or absence of transmission for each of the plurality of pixels, and the number of pixels to be skipped is larger as the range is closer.

In an embodiment, the image sensor exposes all of the pixels in all of the ranges.

In an embodiment, the image sensor merely exposes pixels to be transmitted in each range.

In an embodiment, the plurality of pixels of the image sensor are classified into a plurality of groups. The controller exposes the plurality of groups at different timings with respect to one light emission of the illumination device. Accordingly, the plurality of ranges can be imaged in parallel.

In an embodiment, the image processing device scales the sensor image transmitted from the image sensor such that slice images having same aspect ratio are obtained for each range. The scaling may use interpolation processing or thinning-out processing.

A gated camera according to an embodiment divides a depth direction into a plurality of ranges, and generates a plurality of slice images corresponding to the plurality of ranges. The gated camera includes an illumination device configured to radiate probe light, an image sensor including a plurality of pixels, and a controller configured to control a light emission timing of the illumination device and an exposure timing of the image sensor. The plurality of pixels of the image sensor are classified into a plurality of pixel groups, and the controller exposes the plurality of pixel groups at different timings with respect to one light emission of the illumination device.

According to an embodiment, images of a plurality of ranges can be generated for one light emission. Therefore, a sensing time required to generate the slice images of all of the ranges can be shortened.

In an embodiment, when number of the plurality of pixel groups is n (n≥2), an i-th pixel group may include an (i+n×j)-th (j is an integer) line.

In an embodiment, when number of the plurality of pixel groups is n (n≥2), an i-th pixel group may include an (i+n×j)-th (j is an integer) column.

In an embodiment, the gated camera may further include an image processing device configured to generate the slice images based on a sensor image transmitted from the image sensor. The sensor image generated for each of the pixel groups is transmitted as a unit from the image sensor to the image processing device.

EMBODIMENT

Various embodiments will be described hereinafter with reference to the accompanying drawings. The same or equivalent components, members, and processing shown in the drawings are indicated by the same reference numerals, and repeated description thereof will be appropriately omitted. In addition, the embodiments are not intended to limit the scope of the present invention and are merely for illustration, and all features and combinations thereof described in the embodiments are not necessarily essential to the invention.

First Embodiment

FIG. 1 is a block diagram of a sensing system 10 according to a first embodiment. The sensing system 10 is mounted on a vehicle such as an automobile or a motorcycle, and detects an object OBJ present around the vehicle.

The sensing system 10 mainly includes a gated camera 20. The gated camera 20 includes an illumination device 22, an image sensor 24, a controller 26, and an image processing device 28. Imaging by the gated camera 20 is performed by dividing a depth direction into a plurality of N (N≥2) ranges RNG1 to RNGN. Adjacent ranges may overlap each other in the depth direction at boundaries thereof.

The illumination device 22 radiates probe light L1 toward the front of the vehicle in synchronization with a light emission timing signal S1 supplied from the controller 26. The probe light L1 is preferably infrared light, but is not limited thereto, and may be visible light or ultraviolet light having a predetermined wavelength.

The image sensor 24 includes a plurality of pixels, can perform exposure control in synchronization with an exposure timing signal S2 supplied from the controller 26, and generates a sensor image SI. The image sensor 24 has sensitivity to the same or similar wavelength as that of the probe light L1, and images reflected light (return light) L2 reflected by the object OBJ. A sensor image obtained for an i-th range RNGi is indicated by SIi.

The controller 26 controls a radiation timing (light emission timing) of the probe light L1 by the illumination device 22 and an exposure timing by the image sensor 24. The controller 26 can be implemented by a combination of a processor (hardware) such as a central processing unit (CPU), a micro processing unit (MPU), or a microcomputer and a software program executed by the processor (hardware).

The image sensor 24 and the image processing device 28 are connected via a serial interface, and the sensor image SIi imaged by the image sensor 24 is transmitted to the image processing device 28. The image processing device 28 generates a slice image IMGi based on the sensor image SIi transmitted from the image sensor 24.

Figure 2:
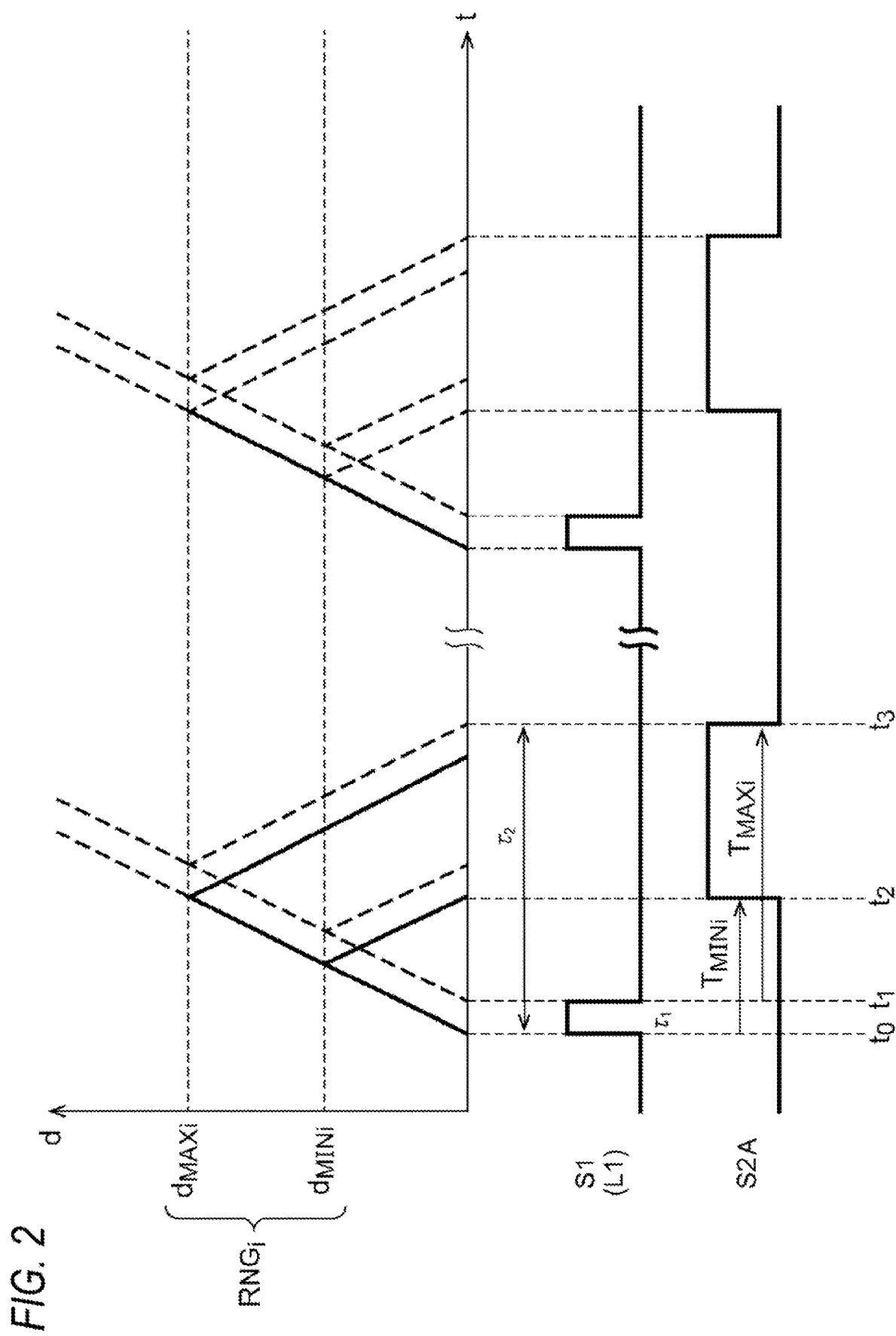
FIG. 2 is a diagram showing a basic operation of a gated camera.

FIG. 2 is a diagram showing a basic operation of the gated camera 20. FIG. 2 shows a state in which the i-th range RNGi is sensed. The illumination device 22 emits light during a light emission period τ1 between times t0 and t1 in synchronization with the light emission timing signal S1. An uppermost stage shows a diagram of light beams in which a horizontal axis indicates time and a vertical axis indicates distance. A distance from the gated camera 20 to a front boundary of the range RNGi is indicated by dMINi, and a distance from the gated camera 20 to a rear boundary of the range RNGi is indicated by dMAXi.

A round-trip time TMINi until the light that departs from the illumination device 22 at a certain time reaches the distance dMINi and the reflected light returns to the image sensor 24 is TMINi=2×dMINi/c. c is the speed of light.

Similarly, a round-trip time TMAXi until the light that departs from the illumination device 22 at a certain time reaches the distance dMAXi and the reflected light returns to the image sensor 24 is TMAXi=2×dMAXi/c.

When it is desired to image merely the object OBJ included in the range RNGi, the controller 26 generates the exposure timing signal S2 so as to start the exposure at a time $t2=t0+TMINi$ and end the exposure at a time $t3=t1+TMAXi$. This is one exposure operation.

At the time of imaging the i-th range RNGi, a plurality of sets of light emission and exposure may be performed. In this case, the controller 26 may repeat the above exposure operation a plurality of times at a predetermined cycle $\tau2$.

Figure 3A:
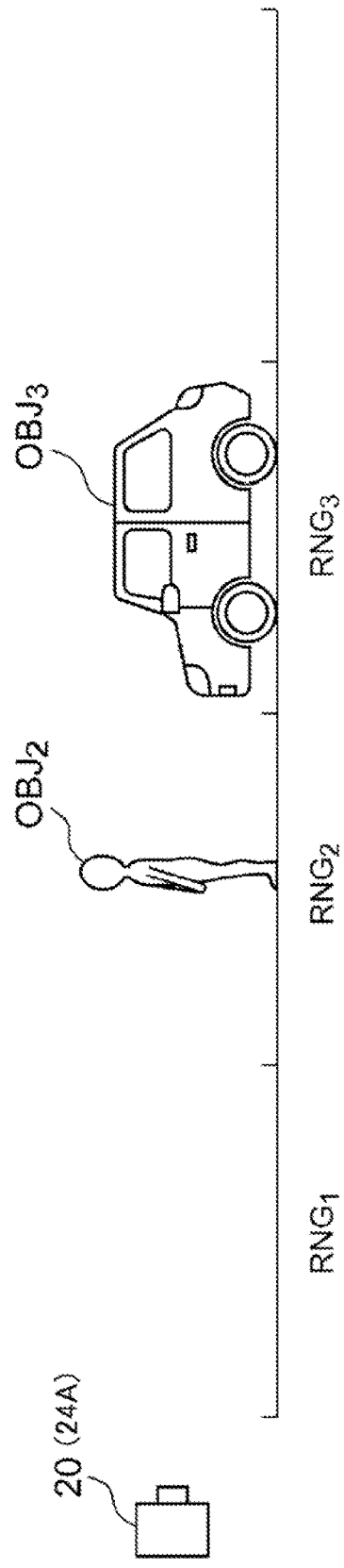
FIG. 3A and FIG. 3B are diagrams showing slice images obtained by the gated camera.
Figure 3B:
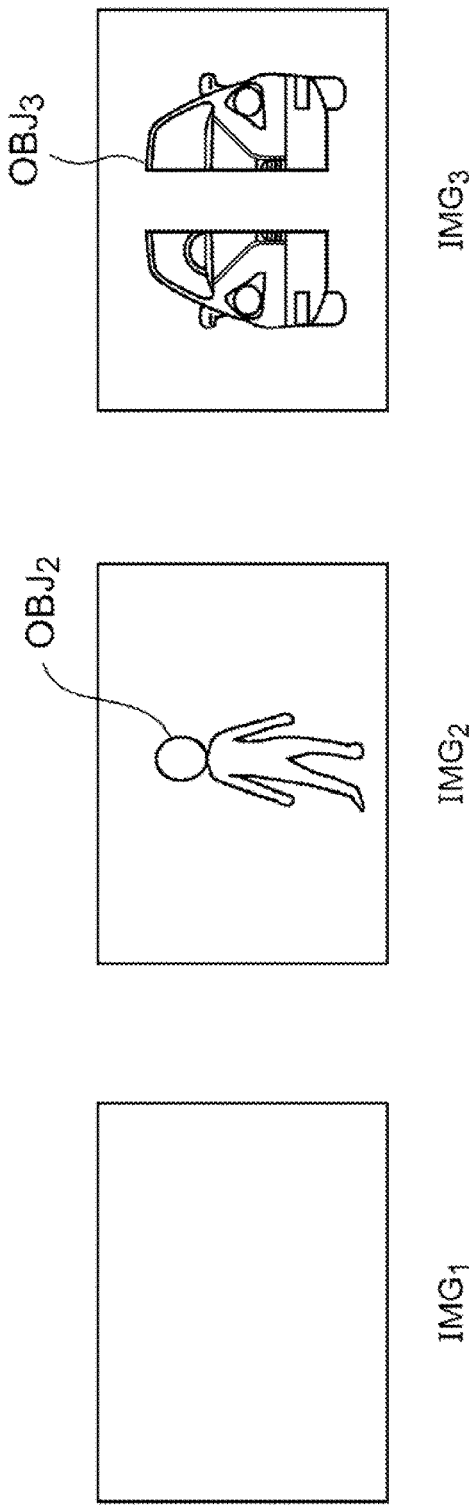

FIGS. 3A and 3B are diagrams showing slice images obtained by the gated camera 20. In the example of FIG. 3A, an object (pedestrian) OBJ2 is present in a range RNG2, and an object (vehicle) OBJ3 is present in a range RNG3. FIG. 3B shows a plurality of slice images IMG1 to IMG3 obtained in the situation of FIG. 3A. When the slice image IMG1 is imaged, since the image sensor is exposed merely by the reflected light from the range RNG1, no object image is captured in the slice image IMG1.

When the slice image IMG2 is imaged, since the image sensor is exposed merely by the reflected light from the range RNG2, merely the object image OBJ2 is captured in the slice image IMG2. Similarly, when the slice image IMG3 is imaged, since the image sensor is exposed merely by the reflected light from the range RNG3, merely the object image OBJ3 is captured in the slice image IMG3. In this way, according to the gated camera 20, it is possible separately image an object for each range.

Figure 4:
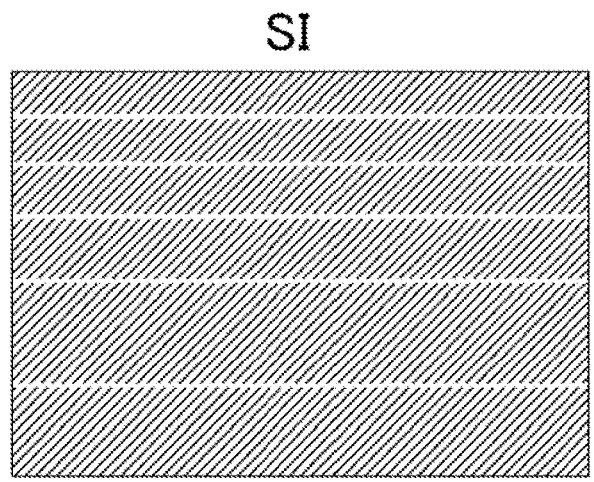
FIG. 4 is a diagram showing a noise in a sensor image SI.

Image processing in the image processing device 28 will be described. FIG. 4 is a diagram showing noise in the sensor image SI. The sensor image SI includes noise in horizontal stripes along lines. The lines in which noise occurs are random, and noise levels are also random.

The image processing device 28 calculates an average value of M (M≥2) pixel values having small pixel values for each line of the sensor image SI, and subtracts the average value from the pixel values of the pixels included in the corresponding line.

M is preferably 2% to 8% of the number of pixels of the corresponding line, and can be set to, for example, about 5%.

Figure 5:
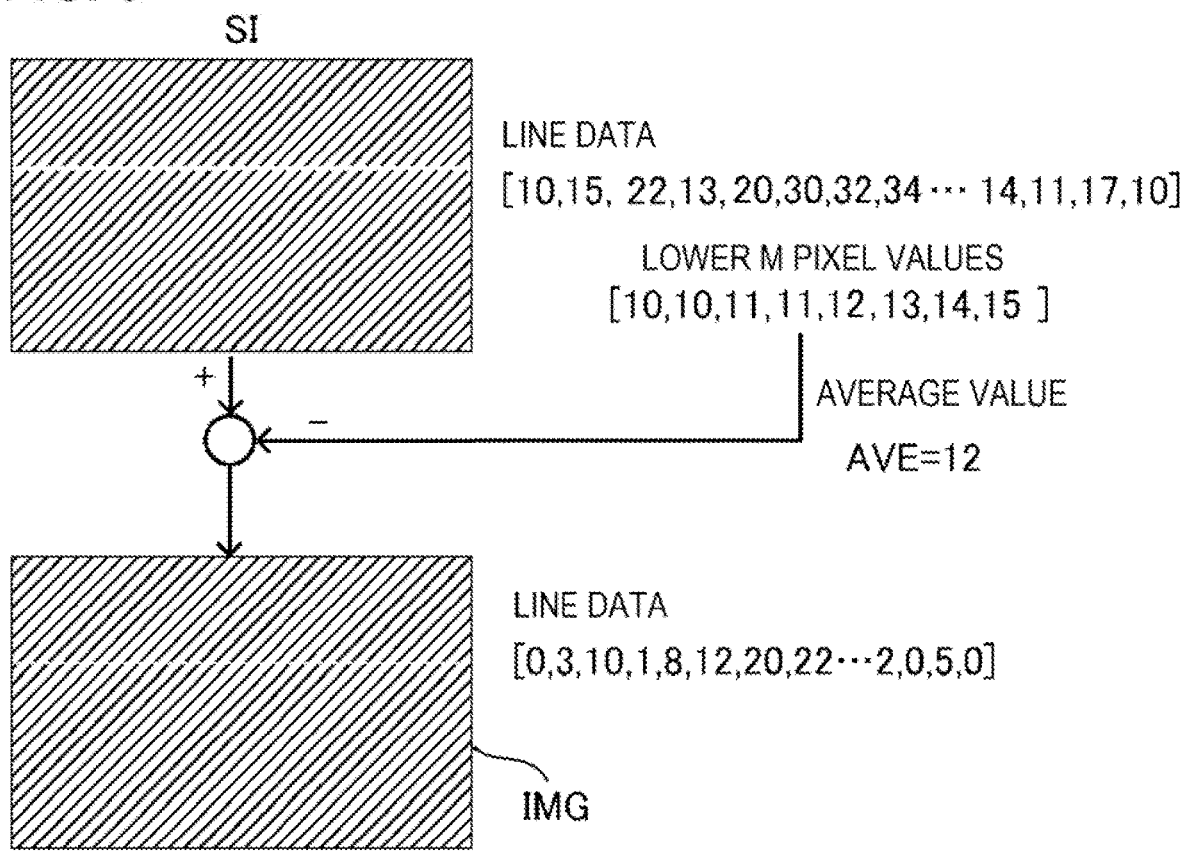
FIG. 5 is a diagram showing noise cancellation by an image processing device.

FIG. 5 is a diagram showing noise cancellation by the image processing device 28. FIG. 5 shows processing on one line. With reference to line data which is a collection of pixel values of a certain line, M pixel values are selected in ascending order of pixel values. In this example, M=8, and pixel values 10, 10, 11, 11, 12, 13, 14, and 15 are selected. The image processing device 28 calculates an average value AVE (12 in this example) of the selected M pixel values. Then, the average value AVE is subtracted from the corresponding line data of the original sensor image SI.

Figure 6A:
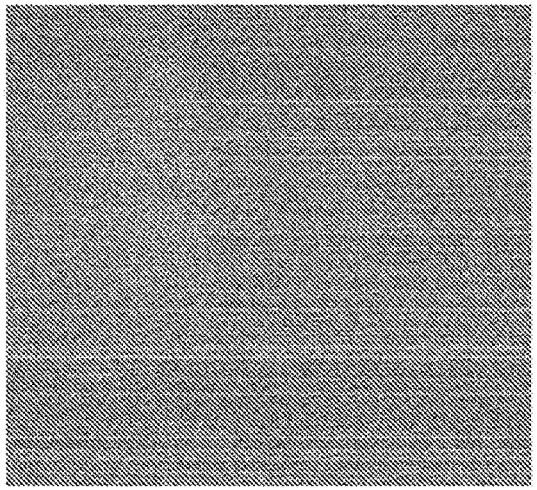
FIGS. 6A and 6B are diagrams showing sensor images before and after noise subtraction processing.
Figure 6B:
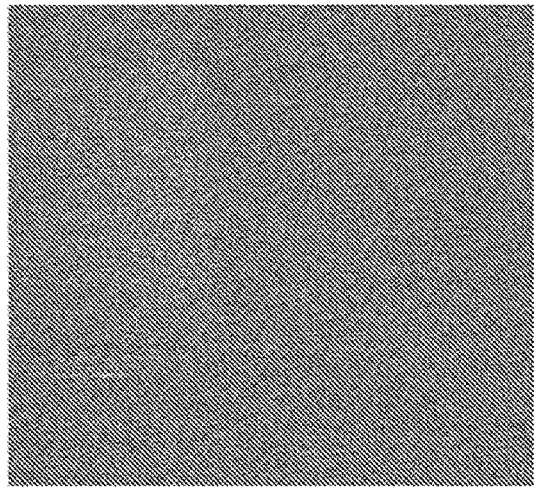
Figure 7A:
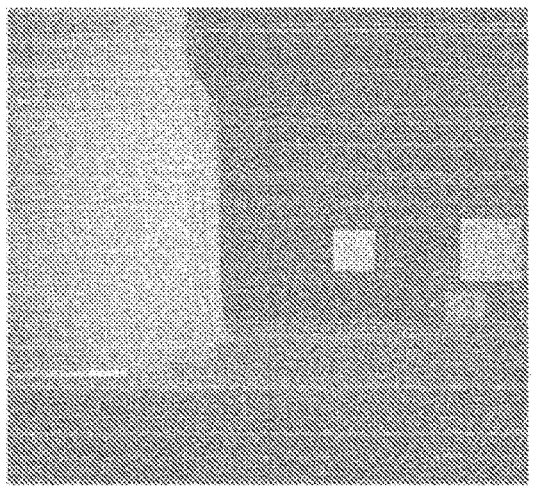
FIGS. 7A and 7B are diagrams showing sensor images before and after noise subtraction processing.
Figure 7B:
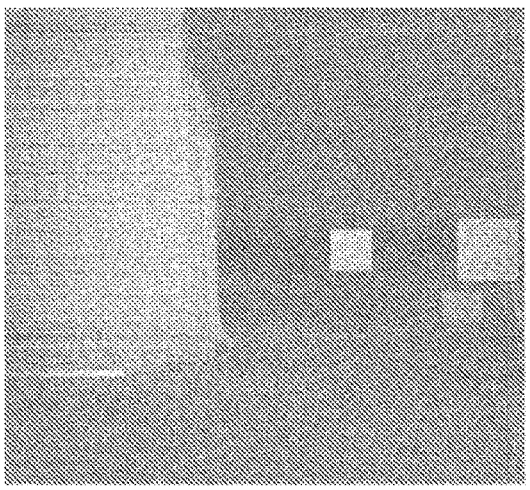

FIGS. 6A and 6B are diagrams showing sensor images before and after noise subtraction processing. FIGS. 7A and 7B are diagrams showing sensor images before and after noise subtraction processing. In FIGS. 6A and 6B, an image not including an object (subject) is taken as a target, and in FIGS. 7A and 7B, an image including an object is taken as a target. In this example, the average value of the number of pixels M corresponding to 5% of each line is calculated. It can be seen that merely background noise can be suitably removed both when an image does not include an object and when an image includes an object.

Second Embodiment

Figure 8:
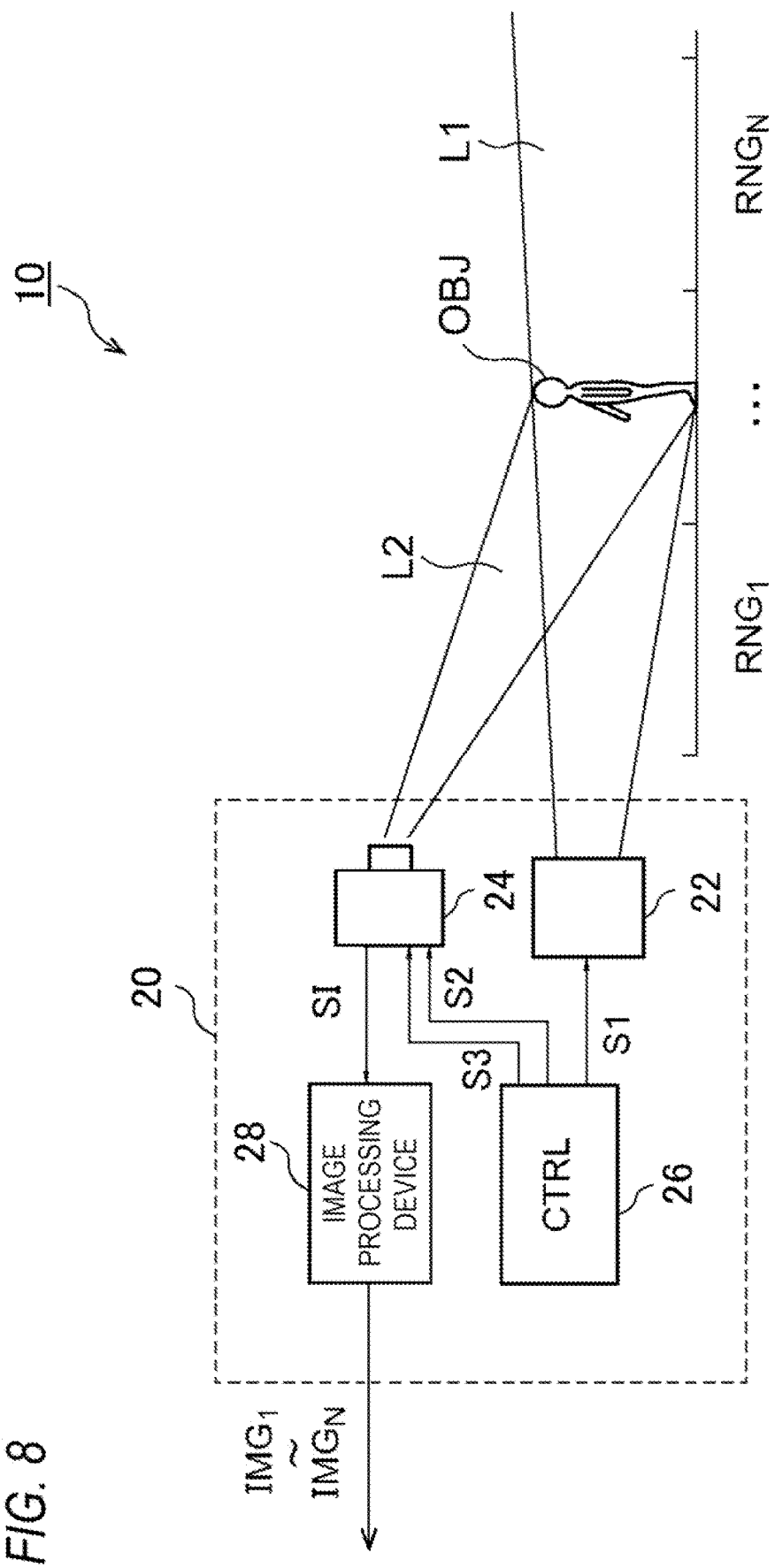
FIG. 8 is a block diagram of a sensing system according to a second embodiment.

FIG. 8 is a block diagram of the sensing system 10 according to a second embodiment. The sensing system 10 is mounted on a vehicle such as an automobile or a motorcycle, and detects the object OBJ present around the vehicle.

The sensing system 10 mainly includes the gated camera 20. The gated camera 20 includes the illumination device 22, the image sensor 24, the controller 26, and the image processing device 28. Imaging by the gated camera 20 is performed by dividing a depth direction into the plurality of N (N≥2) ranges RNG1 to RNGN. Adjacent ranges may overlap each other in the depth direction at boundaries thereof.

The illumination device 22 radiates the probe light L1 toward the front of the vehicle in synchronization with the light emission timing signal S1 supplied from the controller 26. The probe light L1 is preferably infrared light, but is not limited thereto, and may be visible light or ultraviolet light having a predetermined wavelength.

The image sensor 24 includes a plurality of pixels, can perform exposure control in synchronization with the exposure timing signal S2 supplied from the controller 26, and generates the sensor image SI. The image sensor 24 has sensitivity to the same or similar wavelength as that of the probe light L1, and images the reflected light (return light) L2 reflected by the object OBJ. A sensor image obtained for the i-th range RNGi is indicated by SIi.

The controller 26 controls a radiation timing (light emission timing) of the probe light L1 by the illumination device 22 and an exposure timing by the image sensor 24.

The image sensor 24 and the image processing device 28 are connected via a serial interface, and the sensor image SIi imaged by the image sensor 24 is transmitted to the image processing device 28. The image processing device 28 generates the slice image IMGi based on the sensor image SIi transmitted from the image sensor 24.

Figure 9:
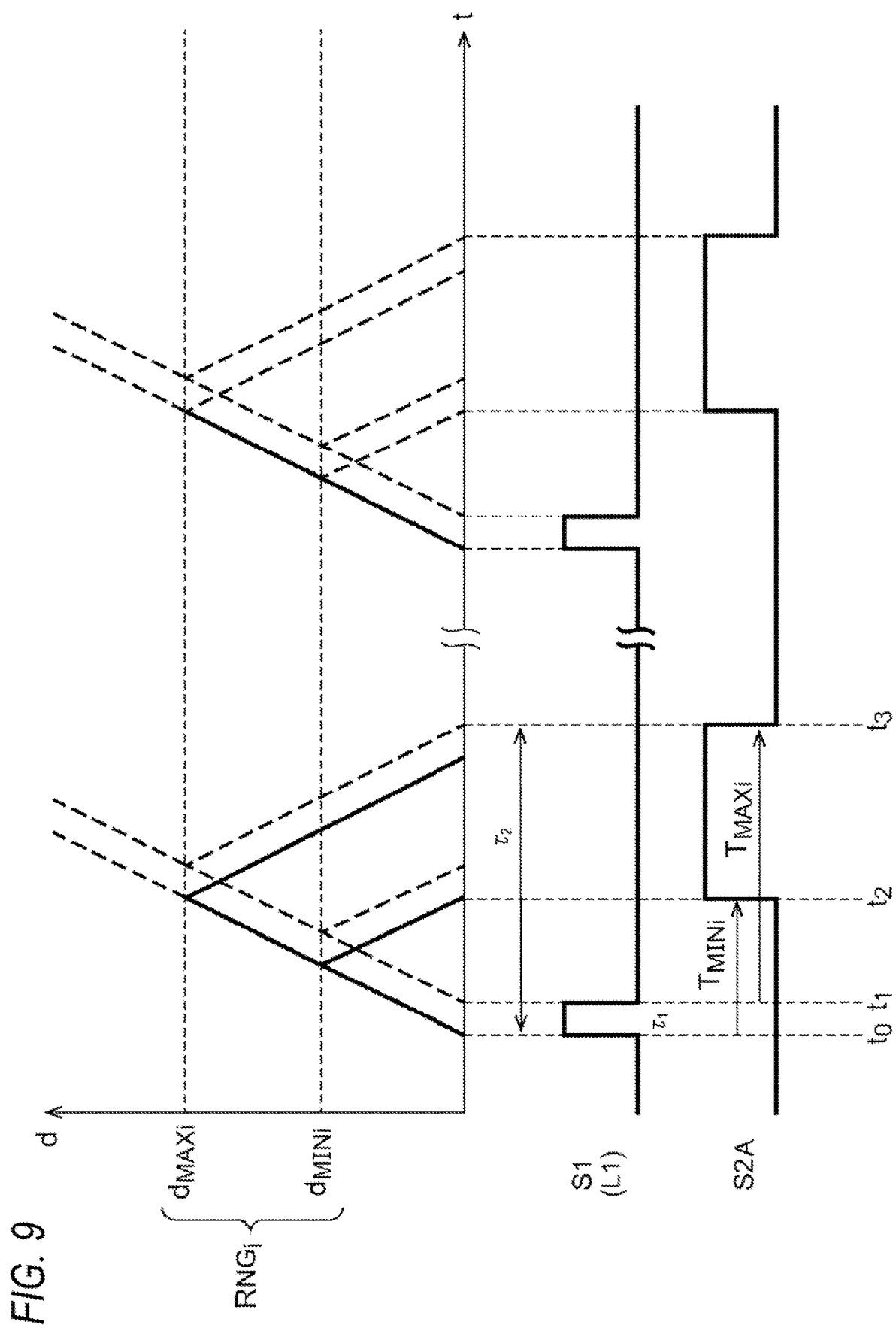
FIG. 9 is a diagram showing a basic operation of a gated camera.

FIG. 9 is a diagram showing a basic operation of the gated camera 20. FIG. 9 shows a state in which the i-th range RNGi is sensed. The illumination device 22 emits light during the light emission period $\tau1$ between the times t0 and t1 in synchronization with the light emission timing signal S1. An uppermost stage shows a diagram of light beams in which a horizontal axis indicates time and a vertical axis indicates distance. A distance from the gated camera 20 to a front boundary of the range RNGi is indicated by dMINi, and a distance from the gated camera 20 to a rear boundary of the range RNGi is indicated by dMAXi.

The round-trip time TMINi until the light that departs from the illumination device 22 at a certain time reaches the distance dMINi and the reflected light returns to the image sensor 24 is $TMINi=2\times dMINi/c$. c is the speed of light.

Similarly, the round-trip time TMAXi until the light that departs from the illumination device 22 at a certain time reaches the distance dMAXi and the reflected light returns to the image sensor 24 is $TMAXi=2\times dMAXi/c$.

When it is desired to image merely the object OBJ included in the range RNGi, the controller 26 generates the exposure timing signal S2 so as to start the exposure at the time $t2=t0+TMINi$ and end the exposure at the time $t3=t1+TMAXi$. This is one exposure operation.

At the time of imaging the i-th range RNGi, a plurality of sets of light emission and exposure may be performed. In this case, the controller 26 may repeat the above exposure operation a plurality of times at the predetermined cycle $\tau2$.

FIGS. 10A and 10B are diagrams showing slice images obtained by the gated camera 20. In the example of FIG. 10A, the object (pedestrian) OBJ2 is present in the range RNG2, and the object (vehicle) OBJ3 is present in the range RNG3. FIG. 10B shows the plurality of slice images IMG1 to IMG3 obtained in the situation of FIG. 10A. When the slice image IMG1 is imaged, since the image sensor is exposed merely by the reflected light from the range RNG1, no object image is captured in the slice image IMG1.

When the slice image IMG2 is imaged, since the image sensor is exposed merely by the reflected light from the range RNG2, merely the object image OBJ2 is captured in the slice image IMG2. Similarly, when the slice image IMG3 is imaged, since the image sensor is exposed merely by the reflected light from the range RNG3, merely the object image OBJ3 is captured in the slice image IMG3. In this way, according to the gated camera 20, it is possible to separately image an object for each range.

Return to FIG. 1. In the present embodiment, a resolution (that is, the number of pixels) of the sensor image SI transmitted from the image sensor 24 to the image processing device 28 changes according to the range. Specifically, the resolution of the sensor image SI is lower (the number of pixels is smaller) as the range is closer, and the resolution of the sensor image SI is higher (the number of pixels is larger) as the range is farther. In the present embodiment, in all of the ranges, all of the pixels of the image sensor 24 are exposed, merely necessary pixels are read out from all of the pixels, and unnecessary pixels are thinned out to generate the sensor image SI. The controller 26 generates a control signal S3 indicating a pixel to be transmitted for each range, and supplies the control signal S3 to the image sensor 24.

The controller 26 can be implemented by a combination of a processor (hardware) such as a central processing unit (CPU), a micro processing unit (MPU), or a microcomputer and a software program executed by the processor (hardware).

FIG. 11 is a diagram showing an example of control on the resolution of the sensor image SI depending on the range. Hatched pixels indicate valid pixels (valid lines) constituting the sensor image SI, and blank pixels indicate invalid pixels (invalid lines) that are not transmitted. In this example, the resolution, in the vertical direction, of the sensor image SI to be transmitted, that is, the number of lines, is controlled according to the range. For example, in the farthest range, all of the lines of the image sensor 24 are valid, and all of the pixels are transmitted as valid pixels. As the range is closer, a ratio (number) of lines to be thinned out increases, and the number of valid pixels decreases.

FIG. 12A is a diagram showing a certain traveling scene, and FIG. 12B is a diagram showing sensor images SIx and SIy obtained in the traveling scene in FIG. 12A.

In the traveling scene of FIG. 12A, a preceding vehicle OBJ1 is present at a position close to an own vehicle on a traveling lane, and an oncoming vehicle OBJ2 is present at a position far from the own vehicle on an oncoming lane. The preceding vehicle OBJ1 is included in an x-th range RNGx, and the oncoming vehicle OBJ2 is included in a y-th range RNGy.

The preceding vehicle OBJ1 in the range RNGx is captured in the sensor image SIx in FIG. 12B, and the oncoming vehicle OBJ2 in the range RNGy is captured in the sensor image SIy. Horizontal lines in FIG. 12B indicate effective lines constituting a sensor image.

The resolution of the sensor image SI in each range may be determined so as to cross the same number of valid lines when the same object (in this example, vehicle) is captured.

FIG. 13A is a time chart showing the operation of the gated camera 20. FIG. 13B is a time chart showing an operation of a gated camera according to a comparative technique.

First, the comparative technique will be described with reference to FIG. 13B. In the comparative technique, the sensor images SI1 to SI3 having the same resolution are transmitted for all of the ranges. In this case, all the sensor images SI1, SI2, and SI3 have the same transmission time, and a time required for sensing the three ranges RNG1 to RNG3 included in one cycle becomes long.

Next, the operation of the gated camera 20 according to the second embodiment will be described with reference to FIG. 13A. In this example, the number of ranges is three, and the range RNG1 covers 0 to 25 m, the range RNG2 covers 25 to 50 m, and the range RNG3 covers 50 to 100 m. For the farthest third range RNG3, all of the lines are valid. Since the distance of the second range RNG2 is substantially half the distance of the third range RNG3, the resolution of the sensor image SI is set to ½. Since the distance of the first range RNG1 is ¼ of the distance of the third range RNG3, the resolution of the sensor image SI is set to ¼. In this case, specifically, in the sensor image SI3, all lines of the image sensor are set as valid lines. In the sensor image SI2, a valid line is selected at a ratio of one line per two lines, and in the sensor image SI1, a valid line is selected at a ratio of one line per four lines.

Since the numbers of pixels of the sensor images SI1, SI2, and SI3 are proportional to the number of lines, a relation of about 1:2:4 is established. Therefore, the transmission time of the sensor image SI1 is shortened to ¼ of the transmission time of the sensor image SI3, and the transmission time of the sensor image SI2 is shortened to ½ of the transmission time of the sensor image SI3. Therefore, the time required for sensing the three ranges RNG1 to RNG3 included in one cycle can be shortened.

The sensor images SI1 and SI2 generated by the line skip as described above are crushed in the vertical direction compared to the sensor image SI3 and have different aspect ratios. Therefore, the image processing device 28 may generate the slice images IMG1 to IMG3 by equalizing the aspect ratios of the sensor images SI1 to SI3 by image processing.

For example, the image processing device 28 may complement, by image processing, invalid lines thinned out at the time of transmission for a sensor image SIj. In this case, all of the slice images IMG1 to IMG3 can have the same resolution.

When a vertical resolution of the sensor image SIj is X times (X<1) at the time of transmission, the image processing device 28 may set the resolution in a horizontal direction to X times. That is, the image processing device 28 may generate the slice image IMGi by thinning out a plurality of columns of the received sensor image SIj.

Figure 14:
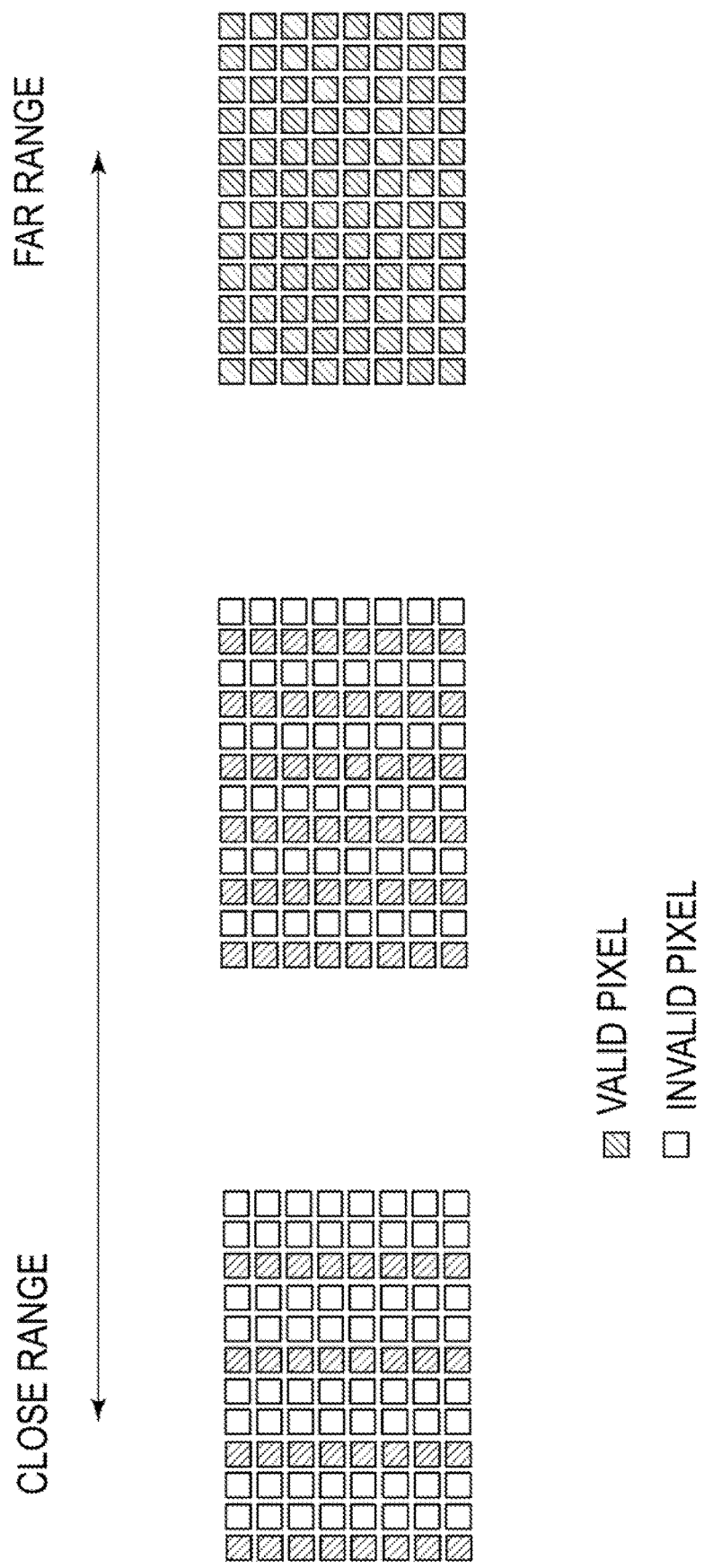
FIG. 14 is a diagram showing another example of control on the resolution of the sensor image SI depending on the range.

In the above description, the resolution of the sensor image in the vertical direction is variable, but the present invention is not limited thereto. FIG. 14 is a diagram showing another example of control on the resolution of the sensor image SI depending on the range. In this example, the resolution, in the horizontal direction, of the sensor image SI to be transmitted, that is, the number of columns is controlled according to the range. For example, in the farthest range, all columns of the image sensor 24 are valid, and all pixels are transmitted as valid pixels. As the range is closer, the ratio (number) of the columns to be thinned out increases, and the number of valid pixels decreases.

Figure 15:
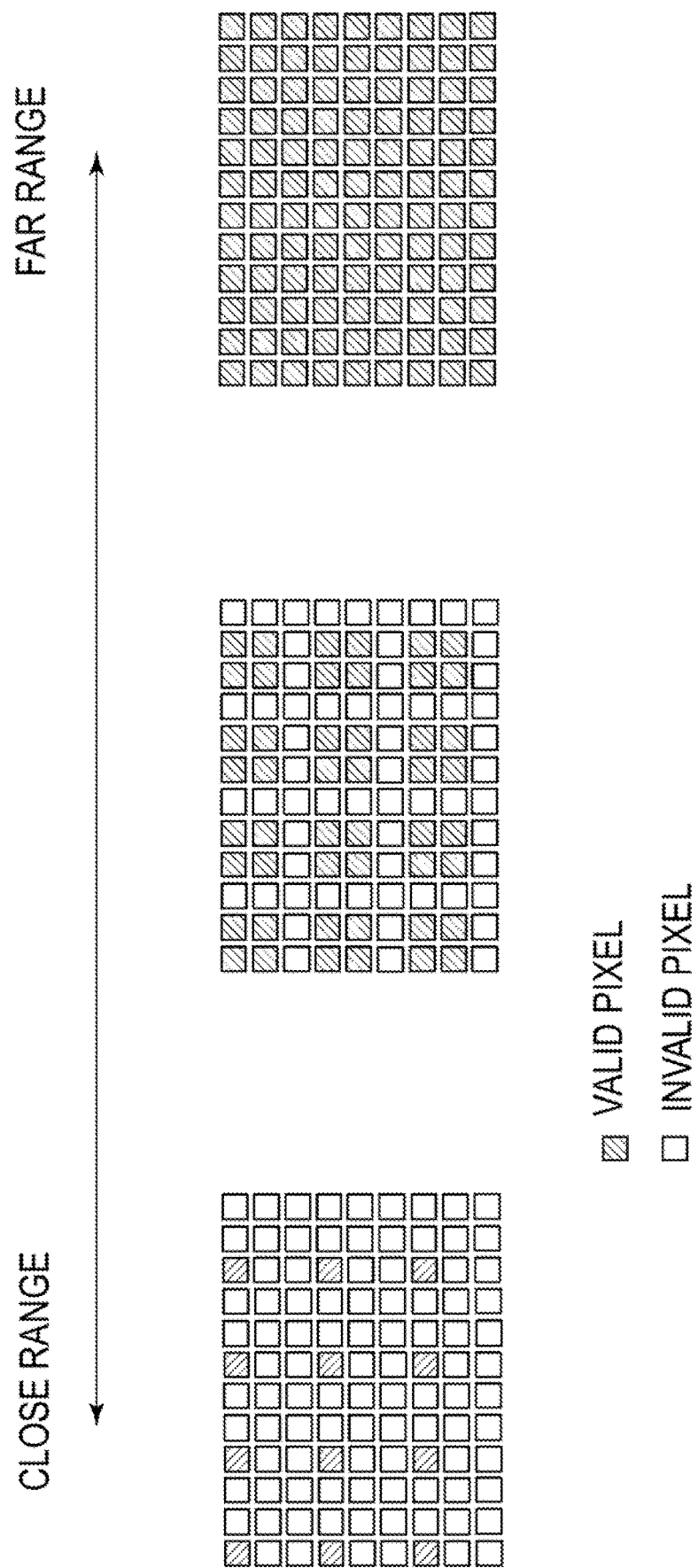
FIG. 15 is a diagram showing still another example of control on the resolution of the sensor image SI depending on the range.

FIG. 15 is a diagram showing still another example of control on the resolution of the sensor image SI depending on the range. In this example, the resolutions, in the horizontal direction and the vertical direction, of the sensor image SI to be transmitted are controlled according to the range.

Next, a modification of the gated camera 20 will be described.

First Modification

In the above description, regardless of the range, the resolution of the sensor image SI is controlled by performing exposure on all pixels of the image sensor 24 and selecting a line or a column to be read, but the present invention is not limited thereto. Depending on the specifications of the image sensor 24, presence or absence of exposure can be controlled for each line, each column, or each pixel. When the image sensor 24 having such a specification is adopted, merely the valid pixels to be transmitted may be exposed in each range.

Second Modification

Figure 16:
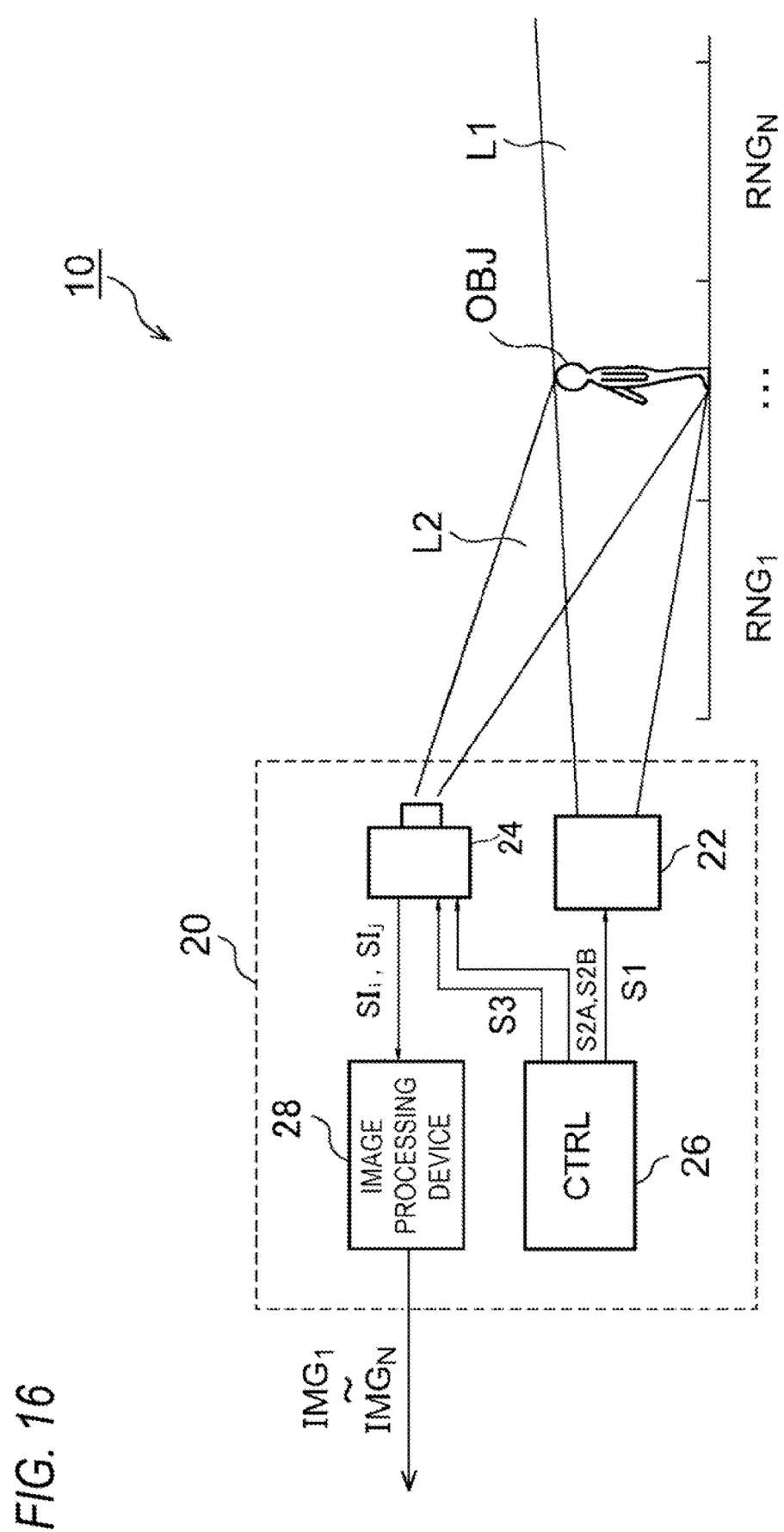
FIG. 16 is a block diagram of a gated camera according to a second modification.

When the image sensor 24 capable of performing exposure control for each pixel is used as in the first modification, it is possible to divide the pixels (lines/columns) into a plurality of groups in a range in which a utilization rate of the pixels (lines/columns) is low and to use the groups for imaging in different ranges. FIG. 16 is a block diagram of the gated camera 20 according to a second modification. For one light emission of the illumination device 22, a first pixel group (line group or column group) of the image sensor 24 is exposed at a first timing, and a second pixel group (line group or column group) of the image sensor 24 is exposed at a second timing. A sensor image formed by the first pixel group and the sensor images SIi and SIj formed by the second pixel group are images obtained by imaging different ranges RNGi and RNGj.

The controller 26 generates the light emission timing signal S1 for the illumination device 22, generates an exposure timing signal S2A for the first pixel group such that an object in the certain range RNGi is exposed, and generates an exposure timing signal S2B for the second pixel group such that an object in the another range RNGj is exposed.

FIG. 17 is a diagram showing exposure of the gated camera 20 according to the second modification. In this example, the utilization rate of pixels (lines) at the time of imaging in one range is 50%. All of the pixels constituting the image sensor 24 are classified, for each row, into the first pixel group of odd-numbered lines and the second pixel group of even-numbered lines, and are subjected to exposure control at different timings.

Figure 18:
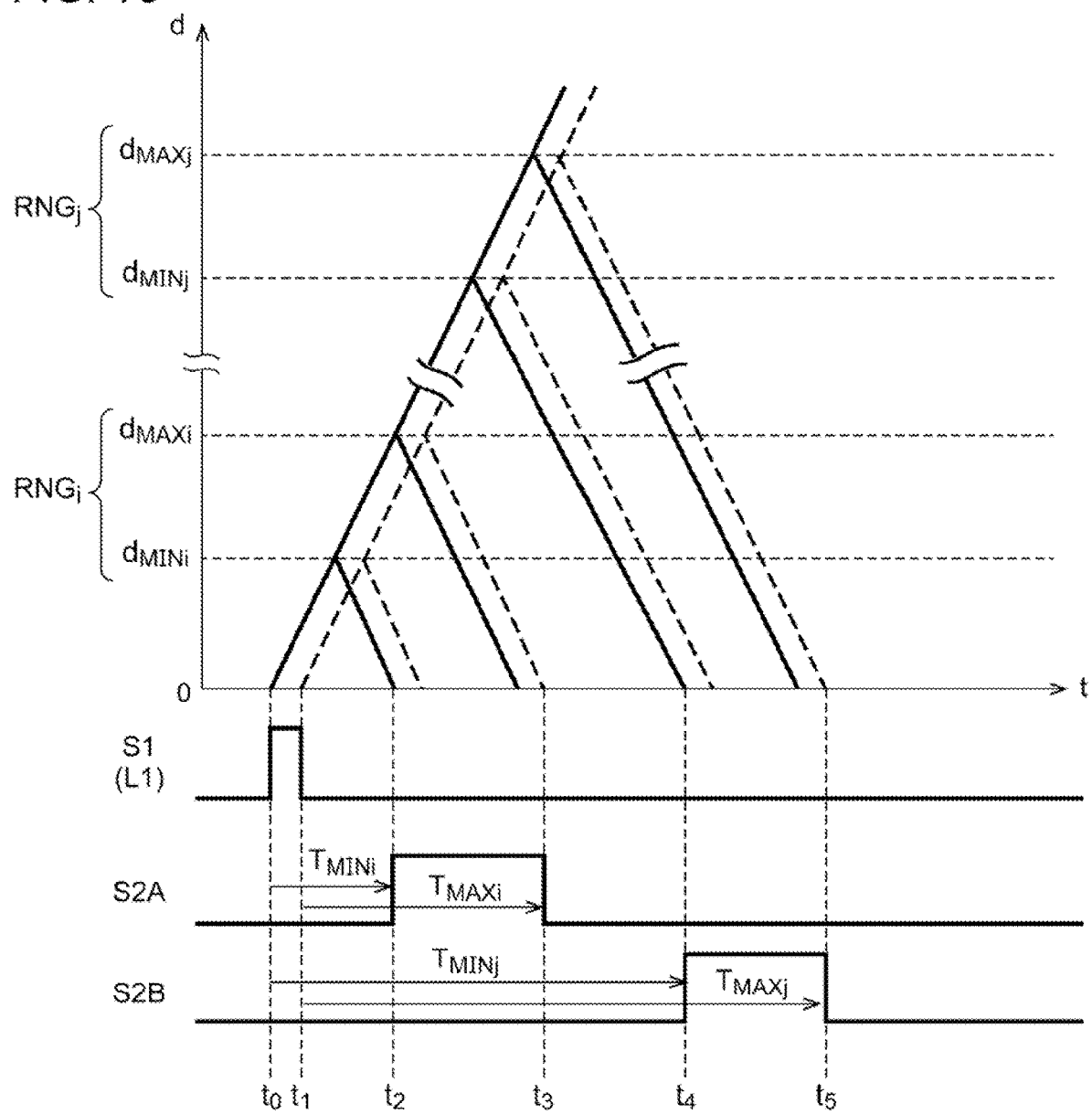
FIG. 18 is a time chart showing an operation of the gated camera according to the second modification.

FIG. 18 is a time chart showing an operation of the gated camera 20 according to the second modification. The first pixel group is assigned to the i-th range RNGi which is relatively close, and the second pixel group is assigned to the j-th range RNGj (j>i). The illumination device 22 emits light during the light emission period τ1 between the times t0 and t1 in synchronization with the light emission timing signal S1. An uppermost stage shows a diagram of light beams in which a horizontal axis indicates time and a vertical axis indicates distance d. A distance from the gated camera 20 to a front boundary of the range RNGi is indicated by dMINi, and a distance from the gated camera 20 to a rear boundary of the range RNGi is indicated by dMAXi. Similarly, a distance from the gated camera 20 to a front boundary of the range RNGj is indicated by dMINj, and a distance from the gated camera 20 to a rear boundary of the range RNGi is indicated by dMAXj.

Therefore, in order to image an object OBJi included in the range RNGi, the exposure timing signal S2A is generated such that the exposure of the first pixel group is started at the time t2=t0+TMINi and the exposure is ended at the time t3=t1+TMAXi.

In order to image an object OBJj included in the range RNGj using the same probe light, the exposure timing signal S2B is generated such that the exposure of the second pixel group is started at a time t4=t0+TMINj and the exposure is ended at a time t5=t1+TMAXj.

$TMINj = 2 \times dMINj/c$ $TMAXj = 2 \times dMAXj/c$

The two ranges RNGi and RNGj to be simultaneously imaged may be adjacent to each other (j=i+1).

According to this modification, the transmission time can be shortened by lowering the resolution of the sensor image SI at the time of imaging a close range.

In addition, since images of two ranges can be obtained by one light emission of the illumination device 22, a utilization efficiency of hardware resources is improved.

When generalized, in a situation where the utilization efficiency of the pixels is 1/N, it is also possible to classify the pixels of the image sensor 24 into N pixel groups and perform imaging in N ranges. In addition, the classification on the pixel group is not limited to a line unit, and may be a column unit or a pixel unit.

Third Embodiment

FIG. 19 is a block diagram of the sensing system 10 according to a third embodiment. The sensing system 10 is mounted on a vehicle such as an automobile or a motorcycle, and detects the object OBJ present around the vehicle.

The sensing system 10 mainly includes the gated camera 20. The gated camera 20 includes the illumination device 22, the image sensor 24, the controller 26, and the image processing device 28. Imaging by the gated camera 20 is performed by dividing a depth direction into a plurality of N (N≥2) ranges RNG1 to RNGN and generating a slice image for each range. Adjacent ranges may overlap each other in the depth direction at boundaries thereof.

The image sensor 24 includes a plurality of pixels, and can individually control the exposure timing for each pixel, for each line, or for each column. The plurality of pixels are classified into a plurality of pixel groups. In the following description, it is assumed that the number of pixel groups is two, and the pixel groups are referred to as a first pixel group and a second pixel group.

For one light emission of the illumination device 22, the gated camera 20 exposes the first pixel group (line group or column group) of the image sensor 24 at a first timing and exposes the second pixel group (line group or column group) of the image sensor 24 at a second timing. A sensor image formed by the first pixel group and the sensor images SIi and SIj formed by the second pixel group are images obtained by imaging different ranges RNGi and RNGj.

Specifically, the controller 26 exposes the first pixel group and the second pixel group at different timings for one light emission of the illumination device 22.

The controller 26 can be implemented by a combination of a processor (hardware) such as a central processing unit (CPU), a micro processing unit (MPU), or a microcomputer and a software program executed by the processor (hardware).

The image sensor 24 and the image processing device 28 may be connected via a serial interface, and the sensor image SIi imaged by the first pixel group of the image sensor 24 and the sensor image SIj imaged by the second pixel group of the image sensor 24 may be transmitted as separate images. The image processing device 28 generates the slice image IMGi based on the sensor image SIi transmitted from the image sensor 24. Image processing in the image processing device 28 is not particularly limited, and for example, interpolation processing or thinning processing for changing an aspect ratio may be performed.

At the time of imaging the i-th range RNGi and the j-th range RNGj, a plurality of sets of light emission and exposure may be performed. In this case, the controller 26 may repeat the light emission and the exposure operation a plurality of times. In this case, the image processing device 28 may generate one slice image IMGi by combining a plurality of sensor images SIi obtained for the same range RNGi.

The configuration of the gated camera 20 is as described above. Next, an operation thereof will be described.

FIG. 20 is a time chart showing the operation of the gated camera 20 in FIG. 19. The first pixel group is assigned to the i-th range RNGi which is relatively close, and the second pixel group is assigned to the j-th range RNGj (j>i). The illumination device 22 emits light during the light emission period τ1 between the times t0 and t1 in synchronization with the light emission timing signal S1. An uppermost stage shows a diagram of light beams in which a horizontal axis indicates time and a vertical axis indicates distance d. A distance from the gated camera 20 to a front boundary of the range RNGi is indicated by dMINi, and a distance from the gated camera 20 to a rear boundary of the range RNGi is indicated by dMAXi. Similarly, a distance from the gated camera 20 to the front boundary of the range RNGj is indicated by dMINj, and a distance from the gated camera 20 to the rear boundary of the range RNGi is indicated by dMAXj.

The round-trip time TMINi until the light that departs from the illumination device 22 at a certain time reaches the distance dMINi and the reflected light returns to the image sensor 24 is TMINi=2×dMINi/c. c is the speed of light.

Similarly, the round-trip time TMAXi until the light that departs from the illumination device 22 at a certain time reaches the distance dMAXi and the reflected light returns to the image sensor 24 is TMAXi=2×dMAXi/c.

When it is desired to image merely the object OBJ included in the range RNGi, the controller 26 generates the exposure timing signal so as to start the exposure at the time t2=t0+TMINi and end the exposure at the time t3=t1+TMAXi. This is one exposure operation.

Therefore, in order to image the object OBJi included in the range RNGi, the exposure timing signal S2A is generated such that the exposure of the first pixel group is started at the time t2=t0+TMINi and the exposure is ended at the time t3=t1+TMAXi.

In order to image the object OBJj included in the range RNGj using the same probe light, the exposure timing signal S2B is generated such that the exposure of the second pixel group is started at the time t4=t0+TMINj and the exposure is ended at the time t5=t1+TMAXj.

TMINj=2×dMINj/c

TMAXj=2×dMAXj/c

The two ranges RNGi and RNGj to be simultaneously imaged may be adjacent to each other (j=i+1).

FIGS. 21A and 21B are diagrams showing slice images obtained by the gated camera 20 in FIG. 19. In the example of FIG. 21A, an object (pedestrian) OBJ2 is present in the range RNG2, and an object (vehicle) OBJ3 is present in the range RNG3. FIG. 21B shows the plurality of slice images IMG1 to IMG3 obtained in the situation of FIG. 21A. When the slice image IMG1 is imaged, since the image sensor is exposed merely by the reflected light from the range RNG1, no object image is captured in the slice image IMG1.

It is assumed that the range RNG2 is assigned to the first pixel group and the range RNG3 is assigned to the second pixel group. At this time, since the first pixel group is exposed merely by the reflected light from the range RNG2, merely the object image OBJ2 is captured in the sensor image SI2. Similarly, since the second pixel group is exposed merely by the reflected light from the range RNG3, merely the object image OBJ3 is captured in the sensor image SI3. In this way, according to the gated camera 20, it is possible to separately image an object for each range.

Since images of the two ranges RNGi and RNGj can be obtained by one light emission of the illumination device 22, a sensing time required for imaging all of the ranges can be shortened. In addition, in a system in which merely one range is imaged by one light emission, reflected light from an object other than the range to be imaged is wasted, but in the present embodiment, reflected light from an object in another range is also detected, and thus, the utilization efficiency of energy is increased.

Next, division of pixel groups will be described. FIGS. 22A to 22D are diagrams showing examples of the pixel groups. In FIG. 22A, the pixels are assigned to the first pixel group and the second pixel group every other line. When the number of the plurality of pixel groups is n (n≥2), an i-th pixel group includes an (i+n×j)-th j is an integer) line. This example is suitable for an image sensor capable of controlling the exposure timing for each line.

Figure 22B:
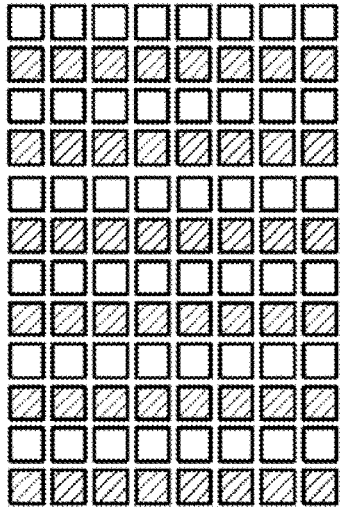
FIGS. 22A to 22D are diagrams showing examples of pixel groups.

In FIG. 22B, the pixels are assigned to the first pixel group and the second pixel group every other column. When the number of pixel groups is n (n≥2), the i-th pixel group includes an (i+n×j)-th (j is an integer) column. This example is suitable for an image sensor capable of controlling the exposure timing for each column.

Figure 22D:
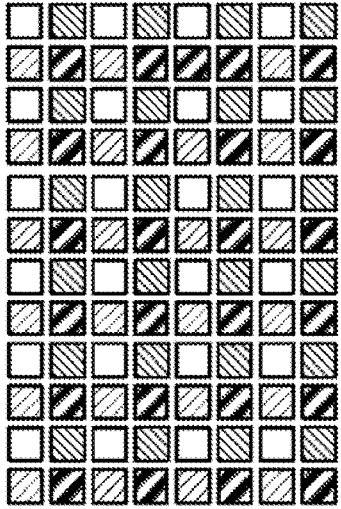
Figure 22A:
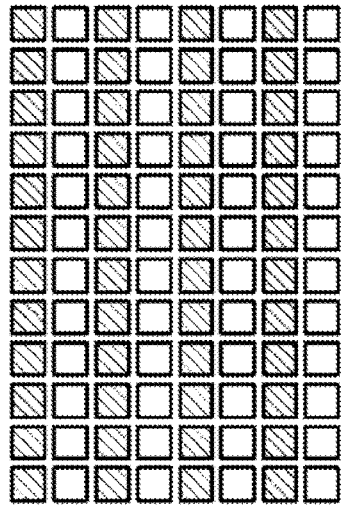
Figure 22C:
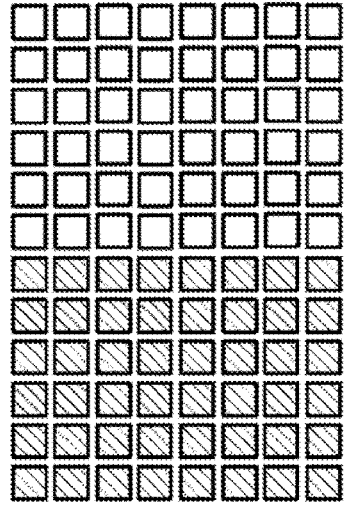

In FIG. 22C, a left half of all of the pixels is sorted to the first pixel group, and a right half of all of the pixels is sorted to the second pixel group. As a modification, an upper half of all of the pixels may be sorted to the first pixel group, and a lower half of all of the pixels may be sorted to the second pixel group.

In FIG. 22D, the number of pixel groups is four. All of the pixels are divided into blocks each including four adjacent pixels, and a first pixel group to a fourth pixel group are formed by selecting one pixel from each block.

The techniques described in the first to third embodiments can be implemented in any combination.

Application

Figure 23:
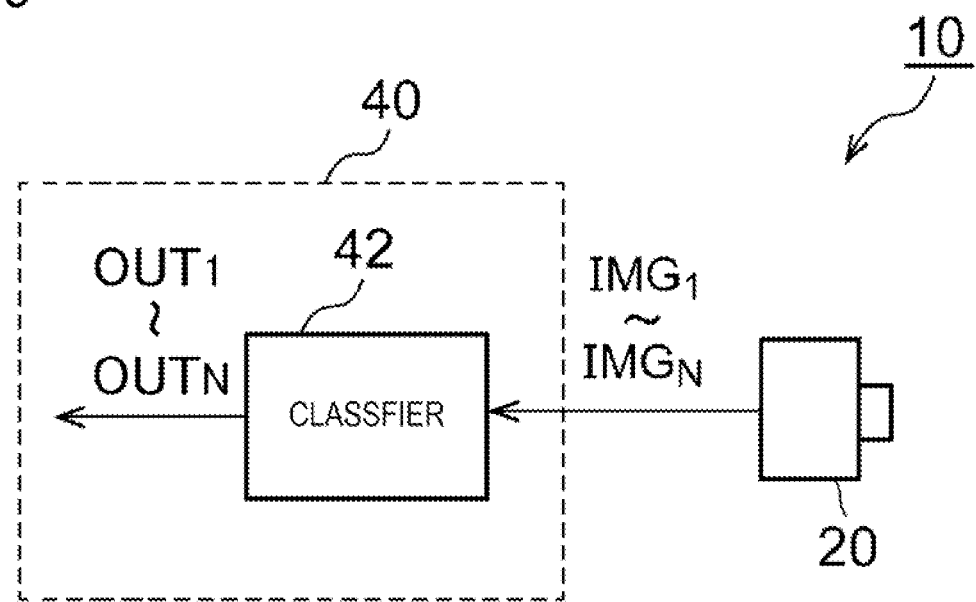
FIG. 23 is a block diagram of the sensing system.

FIG. 23 is a block diagram of the sensing system 10. The sensing system 10 includes an arithmetic processing device 40 in addition to any gated camera 20 described in the first to third embodiments. The sensing system 10 is mounted on a vehicle such as an automobile or a motorcycle, and determines a type (also referred to as category or class) of the object OBJ present around the vehicle.

A plurality of slice images IMG1 to IMGN corresponding to a plurality of ranges RNG1 to RNGN are generated by the gated camera 20. In the i-th slice image IMGi, merely an object included in the corresponding range RNGi is captured.

The arithmetic processing device 40 can identify the type of the object based on the plurality of slice images IMG1 to IMGN corresponding to the plurality of ranges RNG1 to RNGN obtained by the gated camera 20. The arithmetic processing device 40 includes a classifier 42 implemented based on a learned model generated by machine learning. The arithmetic processing device 40 may include a plurality of classifiers 42 optimized for each range. An algorithm of the classifier 42 is not particularly limited, and you only look once (YOLO), single shot multi box detector (SSD), region-based convolutional neural network (RCNN), spatial pyramid pooling (SPPnet), Faster R-CNN, deconvolution-SSD (DSSD), Mask R-CNN, or the like can be adopted, or an algorithm developed in the future can be adopted.

The arithmetic processing device 40 can be implemented by a combination of a processor (hardware) such as a central processing unit (CPU), a micro processing unit (MPU), or a microcomputer and a software program executed by the processor (hardware). The arithmetic processing device 40 may be a combination of a plurality of processors. Alternatively, the arithmetic processing device 40 may be implemented merely by hardware. Functions of the arithmetic processing device 40 and functions of the image processing device 28 may be implemented in the same processor.

Figure 24A:
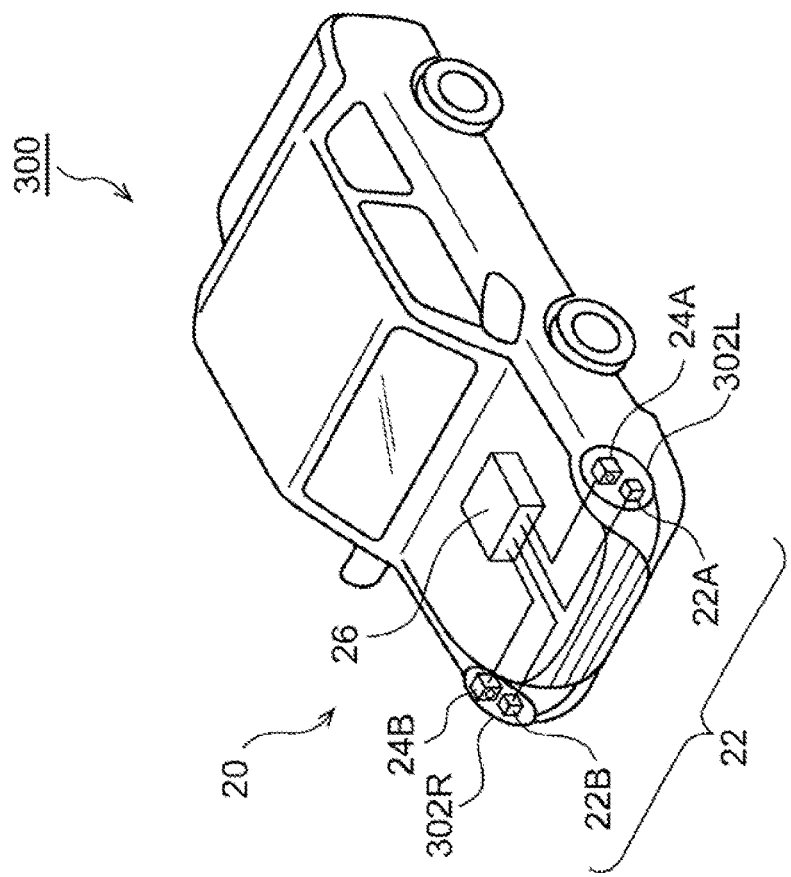
FIGS. 24A and 24B are diagrams showing an automobile including the gated camera.
Figure 24B:
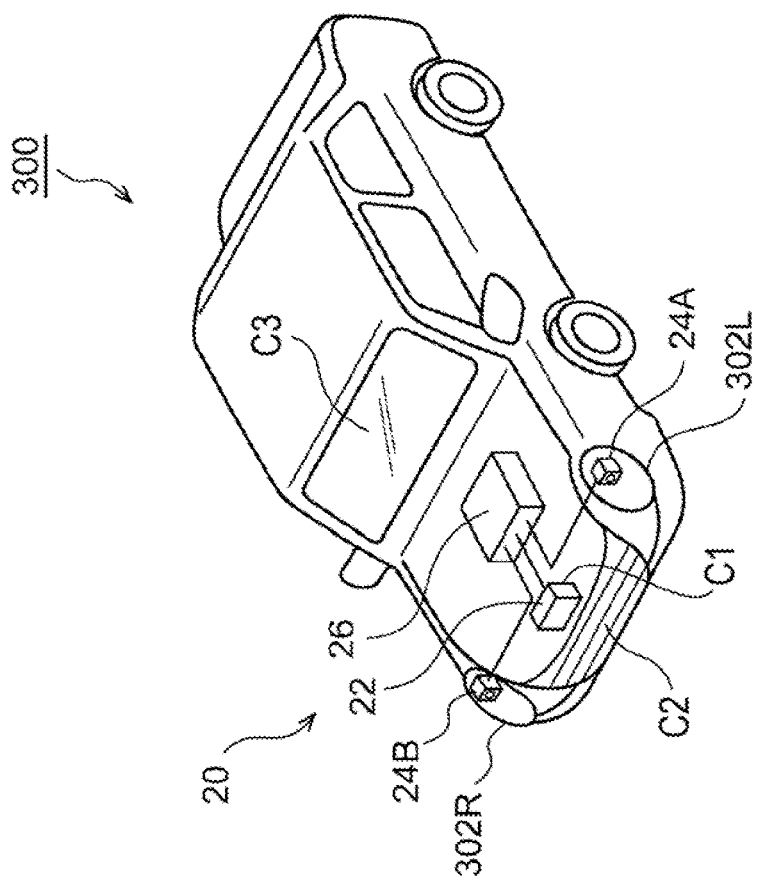

FIGS. 24A and 24B are diagrams showing an automobile 300 including the gated camera 20. Reference is made to FIG. 24A. The automobile 300 includes headlamps (lamps) 302L and 302R. In the automobile 300 in FIG. 24A, one illumination device 22 is provided at the center of the vehicle, and the image sensor 24 is built in one or both of the left and right headlamps 302L and 302R. A position of the illumination device 22 is not particularly limited, and for example, the illumination device 22 may be provided in a front bumper (C1) or a front grille (C2), or may be attached to a rear side (C3) of a rear-view mirror inside a front window. In addition, a position of the controller 26 is not particularly limited, and the controller 26 may be provided in an engine room, in a vehicle interior, or in a head lamp.

Reference is made to FIG. 24B. The illumination device 22 includes a plurality of (for example, two) light sources 22A and 22B. The plurality of light sources 22A and 22B emit light at the same timing, and the emitted light forms one probe light. The plurality of light sources 22A and 22B are built in the left and right headlamps 302L and 302R.

The image sensor 24 is built in one or both of the headlamps 302L and 302R. Alternatively, the image sensor 24 may be provided outside the headlamps 302L and 302R, and may be provided, for example, in the vicinity of the illumination device 22.

Figure 25:
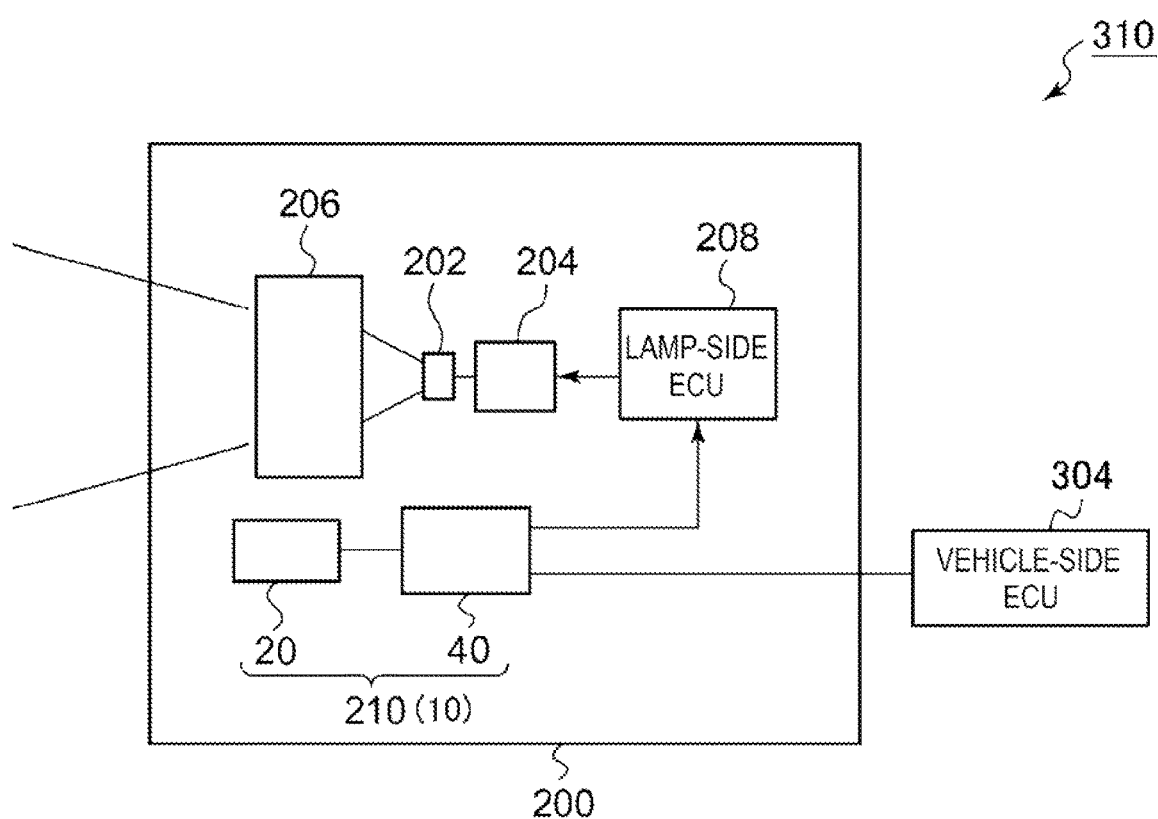
FIG. 25 is a block diagram showing a vehicle lamp including an object detection system.

FIG. 25 is a block diagram showing a vehicle lamp 200 including an object detection system 210. The vehicle lamp 200 constitutes a lamp system 310 together with a vehicle-side ECU 304. The vehicle lamp 200 includes a light source 202, a lighting circuit 204, and an optical system 206. Further, the vehicle lamp 200 is provided with the object detection system 210. The object detection system 210 corresponds to the above sensing system 10, and includes the gated camera 20 and the arithmetic processing device 40.

Information on the object OBJ detected by the arithmetic processing device 40 may be used for light distribution control on the vehicle lamp 200. Specifically, a lamp-side ECU 208 generates an appropriate light distribution pattern based on the information on a type and a position of the object OBJ generated by the arithmetic processing device 40. The lighting circuit 204 and the optical system 206 operate so as to obtain the light distribution pattern generated by the lamp-side ECU 208.

In addition, the information on the object OBJ detected by the arithmetic processing device 40 may be transmitted to the vehicle-side ECU 304. The vehicle-side ECU may perform automatic control based on the information.

Although the present invention has been described using specific words and phrases based on the embodiments, the embodiments merely show one aspect of principles and applications of the present invention, and many modifications and changes in arrangement can be made in the embodiment without departing from the spirit of the present invention defined in the claims.

INDUSTRIAL APPLICABILITY

The present invention relates to a gated camera.

The invention claimed is:

1. A gated camera configured to divide a depth direction into a plurality of ranges and generate a plurality of slice images corresponding to the plurality of ranges, the gated camera comprising:
   an illumination device configured to radiate probe light;
   an image sensor including a plurality of pixels;
   a controller configured to control a light emission timing of the illumination device and an exposure timing of the image sensor; and
   an image processing device configured to generate the slice images based on a sensor image transmitted from the image sensor, the slice images including a first slice image closer to the gated camera and a second slice image farther from the gated camera,
   wherein the slice images are repeatedly transmitted a plurality of times, and
   wherein a resolution of the first slice image is lower than a resolution of the second slice image by skipping transmission of a number of pixels of the first slice image.

2. The gated camera according to claim 1, wherein the image sensor is capable of specifying presence or absence of transmission for each line for the plurality of pixels, and the number of lines to be skipped is larger as corresponding range of the plurality of ranges is closer to the gated camera.

3. The gated camera according to claim 1, wherein the image sensor is capable of specifying presence or absence of transmission for each column for the plurality of pixels, and the number of columns to be skipped is larger as corresponding range of the plurality of ranges is closer to the gated camera.

4. The gated camera according to claim 1, wherein the image sensor is capable of specifying presence or absence of transmission for each of the plurality of pixels, and the number of pixels to be skipped is larger as corresponding range of the plurality of ranges is closer to the gated camera.

5. The gated camera according to claim 1, wherein the image sensor exposes all of the pixels in all of the ranges.

6. The gated camera according to claim 1, wherein the image sensor merely exposes pixels to be transmitted in each range.

7. The gated camera according to claim 6,
   wherein the plurality of pixels of the image sensor are classified into a plurality of groups, and
   wherein the controller exposes the plurality of groups at different timings with respect to one light emission of the illumination device.

8. The gated camera according to claim 1, wherein the image processing device scales the sensor image transmitted from the image sensor such that slice images having same aspect ratio are obtained for each range.

* * * * *